United States Patent
Sakaida

(10) Patent No.: US 6,392,765 B1
(45) Date of Patent: May 21, 2002

(54) INTERPOLATING OPERATION METHOD AND APPARATUS FOR IMAGE SIGNALS

(75) Inventor: Hideyuki Sakaida, Kanagawa (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/204,058

(22) Filed: Dec. 3, 1998

(30) Foreign Application Priority Data

Dec. 3, 1997 (JP) .............................................. 9-332733
Mar. 25, 1998 (JP) ........................................... 10-076836

(51) Int. Cl.⁷ .............................. H04N 1/46; H04N 1/41
(52) U.S. Cl. ...................... 358/525; 382/300; 358/428; 358/518
(58) Field of Search ................................ 382/300, 276, 382/298, 263, 254; 358/525, 518, 520, 428

(56) References Cited

U.S. PATENT DOCUMENTS

| 5,737,101 | A | * | 4/1998 | Ito ............................... 358/525 |
| 5,768,410 | A | * | 6/1998 | Ohta et al. ................... 382/162 |
| 5,774,601 | A | * | 6/1998 | Mahmoodi ................... 382/298 |
| 5,784,502 | A | * | 7/1998 | Inuzuka ....................... 382/300 |
| 5,832,142 | A | * | 11/1998 | Ito et al. ..................... 382/300 |
| 5,889,894 | A | * | 3/1999 | Ito et al. ..................... 382/300 |
| 5,905,822 | A | * | 5/1999 | Ito et al. ..................... 382/300 |
| 5,936,681 | A | * | 8/1999 | Kameoka et al. ........... 348/625 |
| 5,953,465 | A | * | 9/1999 | Saotome ..................... 382/300 |
| 6,175,430 | B1 | * | 1/2001 | Ito .............................. 358/525 |
| 6,263,120 | B1 | * | 7/2001 | Matsuoka ................... 382/300 |

FOREIGN PATENT DOCUMENTS

| EP | 0753828 A3 | * | 1/1997 | ............ G06T/3/40 |
| EP | 753828 A2 | | 1/1997 | ............ G06T/3/40 |

* cited by examiner

Primary Examiner—Edward Coles
Assistant Examiner—Tia A. Carter

(57) ABSTRACT

Interpolating operations are carried out on an original image signal and in accordance with first and second interpolating operation processes for obtaining interpolation images having different levels of sharpness, a feature measure, which represents the sharpness of the original image signal, being thereby obtained. An interpolating operation is carried out on the original image signal and in accordance with a third interpolating operation process, an interpolation image signal being thereby calculated. The interpolation image signal is corrected in accordance with the feature measure, and a final interpolation image signal is thereby obtained. Image size enlargement and reduction with interpolating operations are thus capable of being carried out such that the sharpness at a certain portion of the image may be altered.

32 Claims, 14 Drawing Sheets

FIG. 2
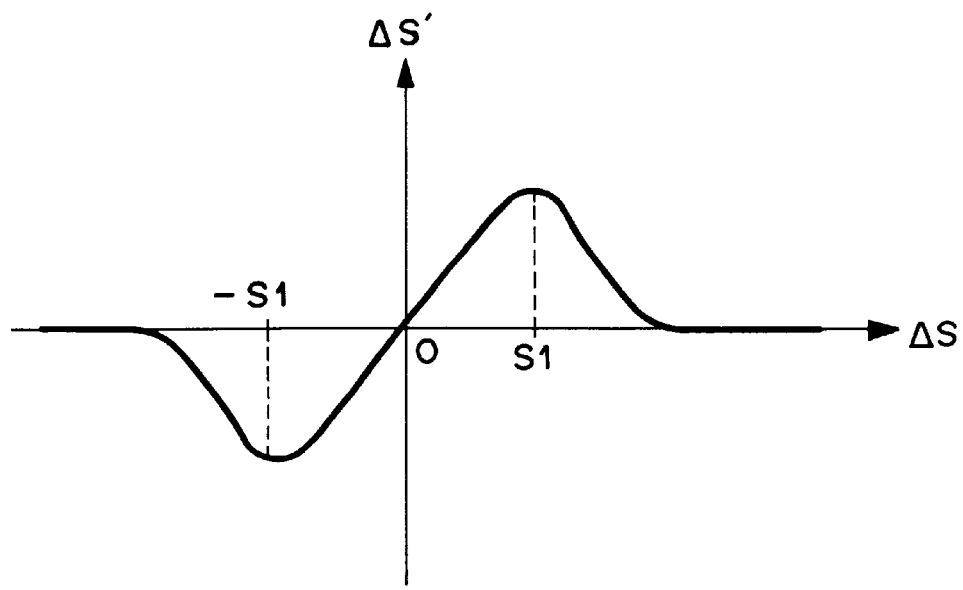
FIG. 3A
FIG. 3B
FIG. 3C

| 1/64 | -2/64 | 1/64 |
|---|---|---|
| -2/64 | 4/64 | -2/64 |
| 1/64 | -2/64 | 1/64 |

INTERPOLATING OPERATION METHOD AND APPARATUS FOR IMAGE SIGNALS

BACKGROUND OF THE INVENTION

1. Field of the Invention

This invention relates to an interpolating operation method and apparatus for an image signal.

2. Description of the Prior Art

Techniques for photoelectrically reading out an image, which has been recorded on a photographic film, in order to obtain an image signal, carrying out appropriate image processing on the image signal, and then reproducing a visible image by use of the processed image signal have heretofore been known in various fields. In image recording and reproducing systems, in which an image signal is obtained and a visible image is reproduced from the image signal, in cases where the region of interest in the visible image is to be viewed in more detail, the region of interest is often enlarged and reproduced. In such cases, if the enlargement of the image size is carried out such that the number of the image signal components of the image signal representing the enlarged image may be identical with the number of the image signal components of the original image signal representing the original image, the sharpness of the enlarged image will be recognized to be lower than the sharpness of the original image due to the visual characteristics of persons. Therefore, if the image is merely enlarged and reproduced, an enlarged image having a high sharpness cannot be obtained, and the details of the image cannot be viewed accurately.

In order for the aforesaid problems to be eliminated, a predetermined interpolating operation may be carried out on the original image signal, which has been obtained by reading out an original image, and an interpolation image signal, which is a secondary image signal and is made up of a number of image signal components different from that of the original image signal, may thereby be formed. Specifically, in cases where an enlarged image is to be reproduced, an interpolation image signal, which is made up of a number of image signal components larger than that of the original image signal, may be formed from the interpolating operation. A visible image may then be reproduced from the interpolation image signal. In this manner, the sharpness of the enlarged image can be prevented from becoming low.

As the interpolating operation methods for carrying out interpolating operations on image signals, various methods have heretofore been proposed. Among such methods, the method using third-order spline interpolating functions is popular. With the interpolating operation method using the third-order spline interpolating functions, digital original image signal components $\{Z_k\}$ in each section are connected by a third-order function $\{f_k\}$, and the value of $f_k$ corresponding to a position, at which an interpolation point is set, (i.e., a setting position in each section) is taken as the value of the interpolated image signal component.

The interpolating operations, which pass through the original image signal in the manner described above, can yield an image having a comparatively high sharpness. As such interpolating operations, cubic spline interpolating operations, and the like, are known. How the cubic spline interpolating operations are carried out will be described hereinbelow.

FIG. 18 is an explanatory graph showing how interpolated image signal components are obtained with a cubic spline interpolating operation from original image signal components, which are sampled with a period of an equal interval and represent sampling points (picture elements) arrayed in one direction. As illustrated in FIG. 18, the image signal components (the original image signal components), which have been detected as digital signal components from an original image and represent a series of picture elements $X_{k-2}, X_{k-1}, X_k, X_{k+1}, X_{k+2}, \ldots$, are respectively represented by $Z_{k-2}, Z_{k-1}, Z_k, Z_{k+1}, Z_{k+2}, \ldots$ A third-order spline interpolating function is set for each of sections $X_{k-2} \sim X_{k-1}$, $X_{k-1} \sim X_k$, $X_k \sim X_{k+1}$, and $X_{k+1} \sim X_{k+2}$. The spline interpolating functions corresponding to the respective sections are represented by $f_{k-2}, f_{k-1}, f_k, f_{k+1}$, and $f_{k+2}$. The interpolating functions are the third-order functions, in which the position in each section serves as a variable.

Firstly, how the interpolating operation is carried out when a point taken for interpolation (hereinbelow referred to as the interpolation point) $X_p$ falls within the section $X_k \sim X_{k+1}$ will be described hereinbelow. The spline interpolating function $f_k$ corresponding to the section $X_k \sim X_{k+1}$ is represented by Formula (1) shown below.

$$f_k(x) = A_k x^3 + B_k x^2 + C_k x + D_k \qquad (1)$$

In the cubic spline interpolating operation, it is necessary that the spline interpolating function $f_k$ passes through the original sampling points (picture elements), and that the first-order differential coefficient of the spline interpolating function $f_k$ is continuous between adjacent sections. Therefore, it is necessary for Formulas (2), (3), (4), and (5) shown below to be satisfied.

$$f_k(X_k) = Z_k \qquad (2)$$

$$f_k(X_{k+1}) = Z_{k+1} \qquad (3)$$

$$f_k'(X_k) = f_{k-1}'(X_k) \qquad (4)$$

$$f_k'(X_{k+1}) = f_{k+1}'(X_{k+1}) \qquad (5)$$

In these formulas, $f_k'$ represents the first-order differentiation $(3A_k x^2 + 2B_k x + C_k)$ of the function $f_k$.

In the strict sense, the cubic spline interpolating operation contains the continuity conditions of the second-order differential coefficient. However, with continuity conditions of the second-order differential coefficient, the operation formulas become complicated. Therefore, the cubic spline interpolating operation is popularly carried out in the form simplified in the manner described above.

Also, in the cubic spline interpolating operation, it is necessary for the first-order differential coefficient at the picture element $X_k$ to satisfy the condition with respect to the picture elements $X_{k-1}$ and $X_{k+1}$, which are located before and after the picture element $X_k$, in that the first-order differential coefficient at the picture element $X_k$ should coincide with the gradient $(Z_{k+1} - Z_{k-1})/(X_{k+1} - X_{k-1})$ of the image signal components $Z_{k-1}$ and $Z_{k+1}$ representing the picture elements $X_{k-1}$ and $X_{k+1}$. Therefore, it is necessary for Formula (6) shown below to be satisfied.

$$f_k'(X_k) = (Z_{k+1} - Z_{k-1})/(X_{k+1} - X_{k-1}) \qquad (6)$$

Also, it is necessary for the first-order differential coefficient at the picture element $X_{k+1}$ to satisfy the condition with respect to the picture elements $X_k$ and $X_{k+2}$, which are located before and after the picture element $X_{k+1}$, in that the first-order differential coefficient at the picture element $X_{k+1}$ should coincide with the gradient $(Z_{k+2} - Z_k)/(X_{k+2} - X_k)$ of the image signal components $Z_k$ and $Z_{k+2}$ representing the picture elements $X_k$ and $X_{k+2}$. Therefore, it is necessary for Formula (7) shown below to be satisfied.

$$f_k'(X_{k+1})=(Z_{k+2}-Z_k)/(X_{k+2}-X_k) \quad (7)$$

It is herein assumed that the interval (i.e., the lattice interval) of each of sections $X_{k-2} \sim X_{k-1}$, $X_{k-1} \sim X_k$, $X_k \sim X_{k+1}$, and $X_{k+1} \sim X_{k+2}$ is equal to 1, and the position of the interpolation point $X_p$, which is taken from the picture element $X_k$ toward the picture element $X_{k+1}$, is represented by t ($0 \leq t \leq 1$). In such cases, from Formulas (1) through (7), the formulas shown below obtain.

$$f_k(0)=D_k=Z_k$$

$$f_k(1)=A_k+B_k+C_k+D_k=Z_{k+1}$$

$$f_k'(0)=C_k=(Z_{k+1}-Z_{k-1})/2$$

$$f_k'(1)=3A_k+2B_k+C_k=(Z_{k+2}-Z_k)/2$$

Therefore, the formulas shown below obtain.

$$A_k=(Z_{k+2}-3Z_{k+1}+3Z_k-Z_{k-1})/2$$

$$B_k=(-Z_{k+2}+4Z_{k+1}-5Z_k+2Z_{k-1})/2$$

$$C_k=(Z_{k+1}-Z_{k-1})/2$$

$$D_k=Z_k$$

As described above, the variable conversion of X=t is carried out, and therefore the spline interpolating function $f_k(X)$ is represented by the formula shown below.

$$f_k(X)=f_k(t)$$

Therefore, an interpolated image signal component $Z_p$ corresponding to the interpolation point $X_p$ may be represented by Formula (8) shown below.

$$Z_p=f_k(t)=A_kt^3+B_kt^2+C_kt+D_k \quad (8)$$

Substituting the coefficients $A_k$, $B_k$, $C_k$, and $D_k$ into Formula (8) yields $$Z_p = \{(Z_{k+2} - 3Z_{k+1} + 3Z_k - Z_{k-1})/2\}t^3 + $$
$$\{(-Z_{k+2} + 4Z_{k+1} - 5Z_k + 2Z_{k-1})/2\}t^2 + \{(Z_{k+1} - Z_{k-1})/2\}t + Z_k$$

Arranging this formula with respect to the image signal components $Z_{k-1}$, $Z_k$, $Z_{k+1}$, and $Z_{k+2}$ yields Formula (9) shown below.

$$Z_p = \{(-t^3 + 2t^2 - t)/2\}Z_{k-1} + \{(3t^3 - 5t^2 + 2)/2\}Z_k + \quad (9)$$
$$\{(-3t^3 + 4t^2 + t)/2\}Z_{k+1} + \{(t^3 - t^2)/2\}Z_{k+2}$$

The coefficients for the image signal components $Z_{k-1}$, $Z_k$, $Z_{k+1}$, and $Z_{k+2}$ are referred to as the interpolation coefficients $c_{k-1}$, $c_k$, $c_{k+1}$, and $c_{k+2}$. Specifically, the interpolation coefficients $c_{k-1}$, $c_k$, $c_{k+1}$, and $c_{k+2}$, which respectively correspond to the image signal components $Z_{k-1}$, $Z_k$, $Z_{k+1}$, and $Z_{k+2}$ in Formula (9), may be represented by the formulas shown below.

$$c_{k-1}=(-t^3+2t^2-t)/2$$

$$c_k=(3t^3-5t^2+2)/2$$

$$c_{k+1}=(-3t^3+4t^2+t)/2$$

$$c_{k+2}=(t^3-t^2)/2$$

The operations described above are repeated for the sections $X_{k-2} \sim X_{k-1}$, $X_{k-1} \sim X_k$, $X_k \sim X_{k+1}$, and $X_{k+1} \sim X_{k+2}$. In this manner, an interpolation image signal can be obtained, which is made up of image signal components occurring at intervals different from those of the image signal components of the entire original image signal.

As described above, in the cubic spline interpolating operation, it is necessary that the spline interpolating function passes through the original sampling points (picture elements), and that the first-order differential coefficient of the spline interpolating function is continuous between adjacent sections. With the interpolating function for the cubic spline interpolating operation, the interpolation image signal for use in the reproduction of a secondary image (i.e., the image obtained from the interpolating operation), which has a comparatively high sharpness, is obtained. On the other hand, as for a portion in the original image, at which the change in density is gentle, the interpolating operation should preferably be carried out such that a secondary image, in which the sharpness is comparatively low and which is smooth, may be obtained. As the interpolating function for obtaining the interpolation image signal representing the secondary image, in which the sharpness is comparatively low and which is smooth, for example, a B spline interpolating operation function is known. In the B spline interpolating operation, the spline interpolating function need not pass through the original sampling points (picture elements), and it is necessary that the first-order differential coefficient and the second-order differential coefficient {represented by f" (X)} of the spline interpolating function are continuous between adjacent sections.

Specifically, in Formula (1), $$f_k(x)=A_kx^3+B_kx^2+C_kx+D_k \quad (1)$$

the conditions shown below should be satisfied.

$$f_k'(X_k)=f_{k-1}'(X_k) \quad (4)$$

$$f_k'(X_{k+1})=f_{k+1}'(X_{k+1}) \quad (5)$$

$$f_k''(X_k)=f_{k-1}''(X_k) \quad (10)$$

$$f_k''(X_{k+1})=f_{k+1}''(X_{k-1}) \quad (11)$$

Also, it is necessary for the first-order differential coefficient at the picture element $X_k$ to satisfy the condition with respect to the picture elements $X_{k-1}$ and $X_{k+1}$, which are located before and after the picture element $X_k$, in that the first-order differential coefficient at the picture element $X_k$ should coincide with the gradient $(Z_{k+1}-Z_{k-1})/(X_{k+1}-X_{k-1})$ of the image signal components $Z_{k-1}$ and $Z_{k+1}$ representing the picture elements $X_{k-1}$ and $X_{k+1}$. Therefore, it is necessary for Formula (6) shown below to be satisfied.

$$f_k'(X_k)=(Z_{k+1}-Z_{k-1})/(X_{k+1}-X_{k-1}) \quad (6)$$

Further, it is necessary for the first-order differential coefficient at the picture element $X_{k+1}$ to satisfy the condition with respect to the picture elements $X_k$ and $X_{k+2}$, which are located before and after the picture element $X_{k+1}$, in that the first-order differential coefficient at the picture element $X_{k+1}$ should coincide with the gradient $(Z_{k+2}-Z_k)/(X_{k+2}-X_k)$ of the image signal components $Z_k$ and $Z_{k+2}$ representing the picture elements $X_k$ and $X_{k+2}$. Therefore, it is necessary for Formula (7) shown below to be satisfied.

$$f_k'(X_{k+1})=(Z_{k+2}-Z_k)/(X_{k+2}-X_k) \quad (7)$$

In general, the function f(X) may be approximately represented by Formula (12) shown below.

$$f(X)=f(0)+f'(0)X+\{f''(0)/2\}X^2 \quad (12)$$

It is herein assumed that the interval (i.e., the lattice interval) of each of sections $X_{k-2}\sim X_{k-1}$, $X_{k-1}\sim X_k$, $X_k\sim X_{k+1}$, and $X_{k+1}\sim X_{k+2}$ is equal to 1, and the position of the interpolation point $X_p$, which is taken from the picture element $X_k$ toward the picture element $X_{k+1}$, is represented by t ($0 \leq t \leq 1$). In such cases, from Formulas (1), (4), (5), (6), (7), (10), (11), and (12), the formulas shown below obtain.

$$f_k'(0)=C_k=(Z_{k+1}-Z_{k-1})/2$$

$$f_k'(1)=3A_k+2B_k+C_k=(Z_{k+2}-Z_k)/2$$

$$f_k''(0)=Z_{k+1}-2Z_k+Z_{k-1}=2B$$

Therefore, the formulas shown below obtain.

$$A_k=(Z_{k+2}-3Z_{k+1}+3Z_k-Z_{k-1})/6$$

$$B_k=(Z_{k+1}-2Z_k+Z_{k-1})/2$$

$$C_k=(Z_{k+1}-Z_{k-1})/2$$

Since $D_k$ is unknown, it is represented by the formula $$D_k=(D_1Z_{k+2}+D_2Z_{k+1}+D_3Z_k+D_4Z_{k-1})/6$$

As described above, the variable conversion of X=t is carried out, and therefore the spline interpolating function $f_k(x)$ is represented by the formula shown below.

$$f_k(x)=f_k(t)$$

Therefore, $$f_k(t) = \{(Z_{k+2} - 3Z_{k+1} + 3Z_k - Z_{k-1})/6\}t^3 + \{(Z_{k+1} - 2Z_k + Z_{k-1})/2\}t^2 +$$
$$\{(Z_{k+1} - Z_{k-1})/2\}t + (D_1Z_{k+2} + D_2Z_{k+1} + D_3Z_k + D_4Z_{k-1})/6$$

Arranging this formula with respect to the image signal components $Z_{k-1}$, $Z_k$, $Z_{k+1}$, and $Z_{k+2}$ yields Formula (13) shown below.

$$f_k(t) = \{(-t^3 + 3t^2 - 3t + D_4)/6\}Z_{k-1} + \{(3t^3 - 6t^2 + D_3)/6\}Z_k + \quad (13)$$
$$\{(-3t^3 + 3t^2 + 3t + D_2)/6\}Z_{k+1} + \{(t^3 + D_1)/6\}Z_{k+2}$$

If t is set to be t=1, the formula shown below will obtain.

$$f_k(1) = \{(D_4 - 1)/6\}Z_{k-1} +$$
$$\{(D_3 - 3)/6\}Z_k + \{(D_2 + 3)/6\}Z_{k+1} + \{(D_1 + 1)/6\}Z_{k+2}$$

As for the section $X_{k+1}\sim X_{k+2}$, as in Formula (13), Formula (14) shown below obtains.

$$f_{k+1}(t) = \{(-t^3 + 3t^2 - 3t + D_4)/6\}Z_k + \{(3t^3 - 6t^2 + D_3)/6\}Z_{k+1} + \quad (14)$$
$$\{(-3t^3 + 3t^2 + 3t + D_2)/6\}Z_{k+2} + \{(t^3 + D_1)/6\}Z_{k+3}$$

If t is set to be t=0, the formula shown below will obtain.

$$f_{k+1}(0) = (D_4/6)Z_k + (D_3/6)Z_{k+1} + (D_2/6)Z_{k+2} + (D_1/6)Z_{k+3}$$

From the continuity condition $\{f_k(1)=f_{k+1}(0)\}$ and the condition in that the coefficients corresponding to the respective original image signal components are equal to each other, $D_4-1=0$, $D_3-3=D_4$, $D_2+3=D_3$, $D_1+1=D_2$, and $D_1=0$. Therefore, $$D_k=(Z_{k+1}+4Z_k+Z_{k-1})/6$$

Accordingly, Formula (15) shown below obtains.

$$Z_p = f_k(t) = \{(-t^3 + 3t^2 - 3t + 1)/6\}Z_{k-1} + \{(3t^3 - 6t^2 + 4)/6\}Z_k + \quad (15)$$
$$\{(-3t^3 + 3t^2 + 3t + 1)/6\}Z_{k+1} + (t^3/6)Z_{k+2}$$

Therefore, the interpolation coefficients $b_{k-1}$, $b_k$, $b_{k+1}$, and $b_{k+2}$, which respectively correspond to the image signal components $Z_{k-1}$, $Z_k$, $Z_{k+1}$, and $Z_{k+2}$, may be represented by the formulas shown below.

$$b_{k-1}=(-t^3+3t^2-3t+1)/6$$

$$b_k=(3t^3-6t^2+4)/6$$

$$b_{k+1}=(-3t^3+3t^2+3t+1)/6$$

$$b_{k+2}=t^3/6$$

The operations described above are repeated for the sections $X_{k-2}\sim X_{k-1}$, $X_{k-1}\sim X_k$, $X_k\sim X_{k+1}$, and $X_{k+1}\sim X_{k+2}$. In this manner, an interpolation image signal can be obtained, which is made up of image signal components occurring at intervals different from those of the image signal components of the entire original image signal.

In this manner, in cases where a secondary image (an interpolation image) having a high sharpness is to be reproduced, for example, the cubic spline interpolating operation may be used. In cases where a secondary image, which has a low sharpness and is smooth, is to be reproduced, for example, the B spline interpolating operation may be used.

In cases where the object of an image is a person, patterns of clothes put on the person and a pattern of the face of the person may be embedded in the image. In cases where the size of such an image is to be enlarged, it is desired that the patterns of designs of the clothes can be reproduced with a high sharpness and a flesh-color region, such as the pattern of the face of the person, can be reproduced with a low sharpness, with noise, such as graininess, being removed, and to be smooth. However, in cases where the size of an image is enlarged with the cubic spline interpolating operation or the B spline interpolating operation described above, processing cannot be carried out such that the sharpness at a certain portion of the image may be enhanced or such that a certain portion of the image may be rendered smooth. Therefore, it is necessary to select whether the sharpness is to be sacrificed or the noise reducing effects are to be sacrificed, and the image size enlargement cannot be carried out such that the two requirements concerning the sharpness and noise may be satisfied at the same time.

SUMMARY OF THE INVENTION

The primary object of the present invention is to provide an interpolating operation method for an image signal, wherein image size enlargement and reduction with interpolating operations are capable of being carried out such that the sharpness at a certain portion of an image may be altered.

Another object of the present invention is to provide an interpolating operation method for an image signal, wherein an interpolation image, which is the same as an interpolation image obtained by converting color signals into a luminance signal and color difference signals and carrying out interpolating operations on the luminance signal and the color difference signals, is capable of being obtained with a reduced amount of operations.

A further object of the present invention is to provide an apparatus for carrying out the interpolating operation method for an image signal.

The present invention provides a first interpolating operation method for an image signal, wherein an interpolating operation is carried out on an original image signal, which is made up of a series of image signal components representing picture elements in an image, an interpolation image signal being obtained from the interpolating operation, the interpolation image signal being made up of a series of image signal components, which occur at intervals different from those of the image signal components of the original image signal, the method comprising the steps of:

i) carrying out interpolating operations on the original image signal and in accordance with first and second interpolating operation processes for obtaining interpolation images having different levels of sharpness, a feature measure, which represents the sharpness of the original image signal, being thereby obtained, ii) carrying out an interpolating operation on the original image signal and in accordance with a third interpolating operation process, an interpolation image signal being thereby calculated, and iii) correcting the interpolation image signal in accordance with the feature measure, a final interpolation image signal being thereby obtained.

In the first interpolating operation method for an image signal in accordance with the present invention, as for the first and second interpolating operation processes for obtaining interpolation images having different levels of sharpness, a B spline interpolating operation process should preferably be employed as the interpolating operation process corresponding to an image having a comparatively low sharpness, and a cubic spline interpolating operation process should preferably be employed as the interpolating operation process corresponding to an image having a sharpness higher than the comparatively low sharpness. This is because, in cases where the B spline interpolating operation process and the cubic spline interpolating operation process are combined with each other, the first-order differential coefficient becomes continuous.

However, the first interpolating operation method for an image signal in accordance with the present invention is not limited to the combination of the B spline interpolating operation process and the cubic spline interpolating operation process. For example, various interpolating operation processes, such as the B spline interpolating operation process, the cubic spline interpolating operation process, a linear interpolating operation process, and a Lagrangean interpolating operation process, may be used, and an arbitrary combination of two of these processes may be employed.

In order for the feature measure and the interpolation image signal to be calculated, they need not necessarily be obtained as the results of calculations with arithmetic formulas. For example, in cases where the interpolating operation method for an image signal in accordance with the present invention is carried out with a computer, the term "calculations of a feature measure and an interpolation image signal" as used herein also means physical calculations, such as the writing of information, which represents the calculated feature measure, and information, which represents the calculated interpolation image signal, into a memory of the computer.

As the third interpolating operation process, one of the above-enumerated interpolating operation processes may be employed. Particularly, either one of the first interpolating operation process and the second interpolating operation process should preferably be employed as the third interpolating operation process.

Also, the calculation of the feature measure should preferably be carried out by calculating difference values between an interpolation image signal, which is obtained by carrying out the interpolating operation on the original image signal and in accordance with the first interpolating operation process, and an interpolation image signal, which is obtained by carrying out the interpolating operation on the original image signal and in accordance with the second interpolating operation process.

Alternatively, the calculation of the feature measure may be carried out by calculating difference interpolation coefficients, which represent differences between interpolation coefficients in the first interpolating operation process and interpolation coefficients in the second interpolating operation process, carrying out an interpolating operation on the original image signal and in accordance with the difference interpolation coefficients, and thereby calculating a difference interpolation image signal.

In a second interpolating operation method for an image signal in accordance with the present invention, the first interpolating operation method for an image signal in accordance with the present invention is applied particularly to a color image. Specifically, the present invention also provides a second interpolating operation method for an image signal, wherein an interpolating operation is carried out on an original image signal, which is made up of a series of image signal components representing picture elements in a color image, an interpolation image signal being obtained from the interpolating operation, the interpolation image signal being made up of a series of image signal components, which occur at intervals different from those of the image signal components of the original image signal, the method comprising the steps of:

i) converting R, G, and B color signal components, which represent each of the picture elements in the color image represented by the original image signal, into a luminance signal component and a color difference signal component, which represent each of the picture elements in the color image, ii) calculating an interpolated luminance signal component by employing the first interpolating operation method for an image signal in accordance with the present invention with respect to the thus obtained luminance signal components, which represent the picture elements in the color image, iii) calculating an interpolated color difference signal component by employing an interpolating operation process, which attaches importance to stability, with respect to the thus obtained color difference signal components, which represent the picture elements in the color image, and iv) converting the interpolated luminance signal component and the interpolated color difference signal component into R, G, and B color signal components, an interpolation image signal, which is composed of the R, G, and B color signal components having been obtained from the conversion of the interpolated luminance signal component and the interpolated color difference signal component, being thereby obtained.

The interpolating operation process, which attaches importance to stability, is the one which ensures the continuity of the signal values when an image signal component is interpolated from the original signal components. By way of example, the interpolating operation process, which attaches importance to stability, may be the B spline interpolating operation process described above.

The present invention further provides a first interpolating operation apparatus for an image signal, wherein an interpolating operation is carried out on an original image signal, which is made up of a series of image signal components representing picture elements in an image, an interpolation image signal being obtained from the interpolating operation, the interpolation image signal being made up of a series of image signal components, which occur at intervals different from those of the image signal components of the original image signal, the apparatus comprising:

i) a feature measure calculating means for carrying out interpolating operations on the original image signal and in accordance with first and second interpolating operation processes for obtaining interpolation images having different levels of sharpness, a feature measure, which represents the sharpness of the original image signal, being thereby obtained, ii) an interpolating operation means for carrying out an interpolating operation on the original image signal and in accordance with a third interpolating operation process, an interpolation image signal being thereby calculated, and iii) a correction means for correcting the interpolation image signal in accordance with the feature measure, a final interpolation image signal being thereby obtained.

In the first interpolating operation apparatus for an image signal in accordance with the present invention, as for the first and second interpolating operation processes for obtaining interpolation images having different levels of sharpness, the B spline interpolating operation process should preferably be employed as the interpolating operation process corresponding to an image having a comparatively low sharpness, and the cubic spline interpolating operation process should preferably be employed as the interpolating operation process corresponding to an image having a sharpness higher than the comparatively low sharpness. However, the first interpolating operation apparatus for an image signal in accordance with the present invention is not limited to the combination of the B spline interpolating operation process and the cubic spline interpolating operation process. For example, various other interpolating operation processes, such as the linear interpolating operation process and the Lagrangean interpolating operation process, may be used.

Also, in the first interpolating operation apparatus for an image signal in accordance with the present invention, as the third interpolating operation process, either one of the first interpolating operation process and the second interpolating operation process should preferably be employed.

Further, the feature measure calculating means should preferably comprise means for calculating, as the feature measure, difference values between an interpolation image signal, which is obtained by carrying out the interpolating operation on the original image signal and in accordance with the first interpolating operation process, and an interpolation image signal, which is obtained by carrying out the interpolating operation on the original image signal and in accordance with the second interpolating operation process.

Alternatively, the feature measure calculating means may comprise:

means for calculating difference interpolation coefficients, which represent differences between interpolation coefficients in the first interpolating operation process and interpolation coefficients in the second interpolating operation process, and means for calculating, as the feature measure, a difference interpolation image signal, which is obtained by carrying out an interpolating operation on the original image signal and in accordance with the difference interpolation coefficients.

In a second interpolating operation apparatus for an image signal in accordance with the present invention, the first interpolating operation method for an image signal in accordance with the present invention is applied particularly to a color image. Specifically, the present invention still further provides a second interpolating operation apparatus for an image signal, wherein an interpolating operation is carried out on an original image signal, which is made up of a series of image signal components representing picture elements in a color image, an interpolation image signal being obtained from the interpolating operation, the interpolation image signal being made up of a series of image signal components, which occur at intervals different from those of the image signal components of the original image signal, the apparatus comprising:

i) a first conversion means for converting R, G, and B color signal components, which represent each of the picture elements in the color image represented by the original image signal, into a luminance signal component and a color difference signal component, which represent each of the picture elements in the color image, ii) an interpolated luminance signal component calculating means for calculating an interpolated luminance signal component by employing the first interpolating operation method for an image signal in accordance with the present invention with respect to the thus obtained luminance signal components, which represent the picture elements in the color image, iii) an interpolated color difference signal component calculating means for calculating an interpolated color difference signal component by employing an interpolating operation process, which attaches importance to stability, with respect to the thus obtained color difference signal components, which represent the picture elements in the color image, and iv) a second conversion means for converting the interpolated luminance signal component and the interpolated color difference signal component into R, G, and B color signal components, an interpolation image signal, which is composed of the R, G, and B color signal components having been obtained from the conversion of the interpolated luminance signal component and the interpolated color difference signal component, being thereby obtained.

The present invention also provides a third interpolating operation method for an image signal, wherein an interpolating operation is carried out on an original image signal, which is made up of a series of image signal components representing picture elements in a color image, an interpolation image signal being obtained from the interpolating operation, the interpolation image signal being made up of a series of image signal components, which occur at intervals different from those of the image signal components of the original image signal, the method comprising the steps of:

i) carrying out an interpolating operation on each of R color signal components, G color signal components, and B color signal components, which represent the picture elements in the color image represented by the original image signal, the interpolating operation being carried out by employing a predetermined interpolating operation process, intermediate interpolated color signal components being thereby calculated with respect to each of the R color signal components, the G color signal components, and the B color signal components, ii) calculating luminance signal components of the original image signal from the R, G, and B color signal components, which represent the picture elements in the color image represented by the original image signal, iii) calculating a feature measure, which represents the sharpness of the original image signal, from the luminance signal components, and iv) correcting the intermediate interpolated color signal components in accordance with the feature measure, an interpolation image signal, which is composed of the corrected R, G, and B intermediate interpolated color signal components, being thereby obtained.

In the third interpolating operation method for an image signal in accordance with the present invention, the predetermined interpolating operation process should preferably be an interpolating operation process, which attaches importance to stability.

Also, the calculation of the feature measure should preferably be carried out by calculating difference interpolation coefficients, which represent differences between interpolation coefficients in an interpolating operation process, which attaches importance to sharpness, and interpolation coefficients in the predetermined interpolating operation process, carrying out an interpolating operation on the luminance signal components and in accordance with the difference interpolation coefficients, and thereby calculating difference interpolated luminance signal components.

The interpolating operation process, which attaches importance to stability, is the one which ensures the continuity of the signal values when an image signal component is interpolated from the original signal components. By way of example, the interpolating operation process, which attaches importance to stability, may be the B spline interpolating operation process described above. The interpolating operation process, which attaches importance to sharpness, is the one in which the sharpness is emphasized. By way of example, the interpolating operation process, which attaches importance to sharpness, may be the cubic spline interpolating operation process described above.

Further, in the third interpolating operation method for an image signal in accordance with the present invention, the calculation of the feature measure should preferably be carried out by extracting edge components from the luminance signal components, and carrying out an interpolating operation on the edge components and in accordance with an interpolating operation process, which attaches importance to sharpness.

The present invention further provides a third interpolating operation apparatus for an image signal, wherein an interpolating operation is carried out on an original image signal, which is made up of a series of image signal components representing picture elements in a color image, an interpolation image signal being obtained from the interpolating operation, the interpolation image signal being made up of a series of image signal components, which occur at intervals different from those of the image signal components of the original image signal, the apparatus comprising:

i) an intermediate interpolating operation means for carrying out an interpolating operation on each of R color signal components, G color signal components, and B color signal components, which represent the picture elements in the color image represented by the original image signal, the interpolating operation being carried out by employing a predetermined interpolating operation process, intermediate interpolated color signal components being thereby calculated with respect to each of the R color signal components, the G color signal components, and the B color signal components, ii) a luminance signal component calculating means for calculating luminance signal components of the original image signal from the R, G, and B color signal components, which represent the picture elements in the color image represented by the original image signal, iii) a feature measure calculating means for calculating a feature measure, which represents the sharpness of the original image signal, from the luminance signal components, and iv) a correction means for correcting the intermediate interpolated color signal components in accordance with the feature measure, an interpolation image signal, which is composed of the corrected R, G, and B intermediate interpolated color signal components, being thereby obtained.

In the third interpolating operation apparatus for an image signal in accordance with the present invention, the predetermined interpolating operation process should preferably be an interpolating operation process, which attaches importance to stability.

Also, the feature measure calculating means should preferably be means that carries out the calculation of the feature measure by calculating difference interpolation coefficients, which represent differences between interpolation coefficients in an interpolating operation process, which attaches importance to sharpness, and interpolation coefficients in the predetermined interpolating operation process, carrying out an interpolating operation on the luminance signal components and in accordance with the difference interpolation coefficients, and thereby calculating difference interpolated luminance signal components.

Further, in the third interpolating operation apparatus for an image signal in accordance with the present invention, the feature measure calculating means should preferably be means that carries out the calculation of the feature measure by extracting edge components from the luminance signal components, and carrying out an interpolating operation on the edge components and in accordance with an interpolating operation process, which attaches importance to sharpness.

With the first interpolating operation method and apparatus for an image signal in accordance with the present invention, the interpolating operations are carried out on the original image signal and in accordance with the first and second interpolating operation processes for obtaining interpolation images having different levels of sharpness, and the feature measure, which represents the sharpness of the original image signal, is thereby obtained. Also, the interpolating operation is carried out on the original image signal and in accordance with the third interpolating operation process, and the interpolation image signal is thereby calculated. The interpolation image signal is then corrected in accordance with the feature measure, and the final interpolation image signal is thereby obtained. Since the interpolation image signal is thus corrected in accordance with the feature measure, which represents the sharpness of the image, the sharpness can be emphasized with respect to an image portion, which is to be reproduced with a high level of sharpness. Also, the sharpness can be reduced with respect to an image portion, which is to be reproduced to be smooth with a low level of sharpness. Therefore, the sharpness at a certain portion of the image can be enhanced, or a certain portion of the image can be rendered smooth, such that the sharpness or the noise reducing effects may not be sacrificed.

With the second interpolating operation method and apparatus for an image signal in accordance with the present invention, the same effects as those described above can be obtained.

With the third interpolating operation method and apparatus for an image signal in accordance with the present invention, the interpolating operation is carried out on each of the R color signal components, G color signal components, and B color signal components, which represent the picture elements in the color image represented by the original image signal, the interpolating operation being carried out by employing the predetermined interpolating operation process. The intermediate interpolated color signal components are thereby calculated with respect to each of the R color signal components, the G color signal components, and the B color signal components. Also, the luminance signal components of the original image signal are calculated from the R, G, and B color signal components, which represent the picture elements in the color image represented by the original image signal. Further, the feature measure, which represents the sharpness of the original image signal, is calculated from the luminance signal components. The intermediate interpolated color signal components are then corrected in accordance with the feature measure, and the final interpolation image signal, which is composed of the corrected R, G, and B intermediate interpolated color signal components, is thereby obtained. Since the intermediate interpolated color signal components are thus corrected in accordance with the feature measure, which represents the sharpness of the original image, the sharpness can be emphasized with respect to an image portion, which is to be reproduced with a high level of sharpness. Also, the sharpness can be reduced with respect to an image portion, which is to be reproduced to be smooth with a low level of sharpness. Therefore, the sharpness at a certain portion of the image can be enhanced, or a certain portion of the image can be rendered smooth, such that the sharpness or the noise reducing effects may not be sacrificed. Further, with the third interpolating operation method and apparatus for an image signal in accordance with the present invention, wherein only the luminance signal components are calculated from the original image signal, it is not necessary for operations to be carried out for completely converting the original image signal into the luminance signal components and color difference signal components. Accordingly, the time required for operations can be kept short, and the interpolating operation can be carried out quickly.

BRIEF DESCRIPTION OF THE DRAWINGS

FIG. 2 is a graph showing a correcting function, FIGS. 3A, 3B, and 3C are explanatory views showing how processing is carried out in an addition means 35 in the first embodiment.

DESCRIPTION OF THE PREFERRED EMBODIMENTS

The present invention will hereinbelow be described in further detail with reference to the accompanying drawings.

Figure 1:
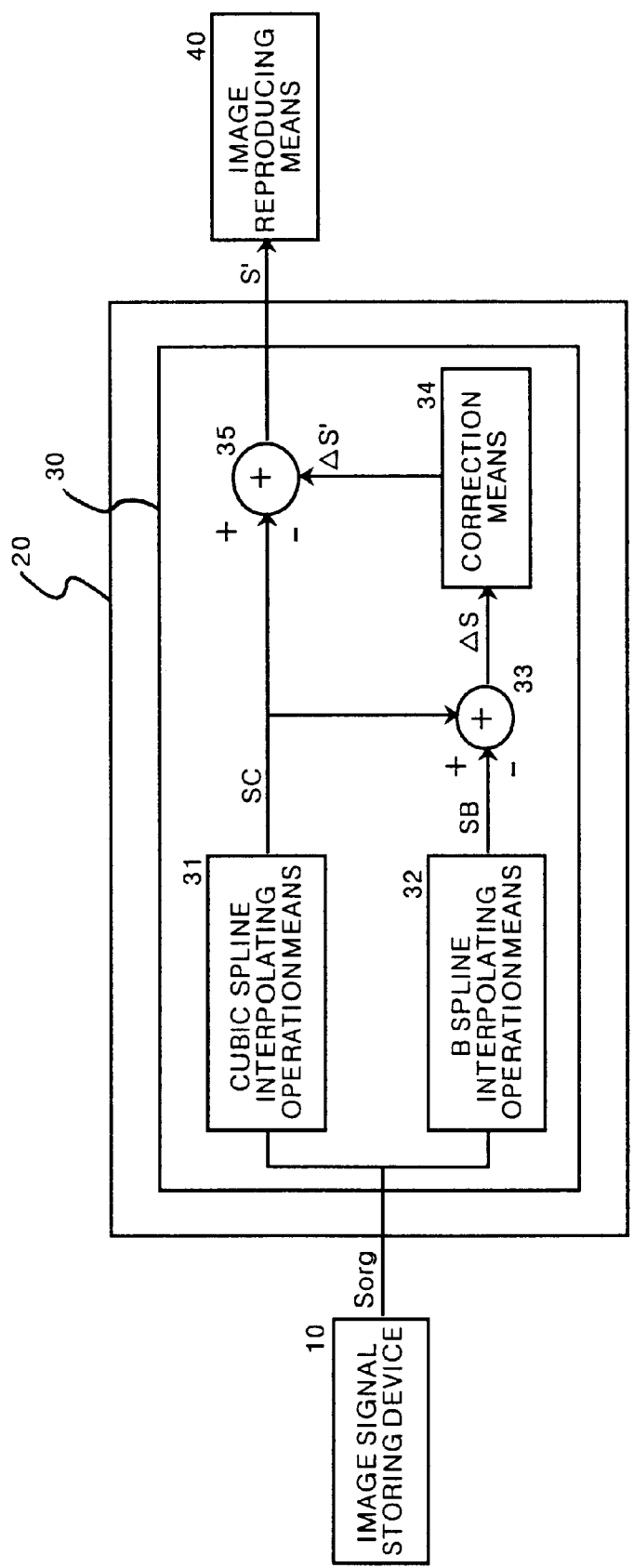
FIG. 1 is a block diagram showing an image reproducing system provided with a first embodiment of the interpolating operation apparatus for carrying out the interpolating operation method for an image signal in accordance with the present invention.

FIG. 1 is a block diagram showing an image reproducing system provided with an interpolating operation apparatus 30, which is a first embodiment of the interpolating operation apparatus for carrying out the interpolating operation method for an image signal in accordance with the present invention. As illustrated in FIG. 1, the image reproducing system, which is provided with the interpolating operation apparatus 30 serving as the first embodiment, comprises an image signal storing device 10 for storing an image signal representing an image, and an image processing apparatus 20 for carrying out predetermined signal processing on the original image signal Sorg (representing a color image or a black-and-white image), which is received from the image signal storing device 10, such that an image signal conforming to a predetermined reproduction size may be obtained. The image reproducing system also comprises an image reproducing means 40 for reproducing a visible image of the predetermined reproduction size from an interpolation image signal S', which has been obtained from the predetermined signal processing carried out by the image processing apparatus 20. The image reproducing means 40 may be a CRT display device, a printer, or the like.

The image processing apparatus 20 carries out the signal processing on the original image signal Sorg, such that an image signal conforming to, for example, one of various sizes (an L size, a postcard size, an A4 size, and the like) of photographic paper for image reproduction may be obtained. The image processing apparatus 20 is provided with the interpolating operation apparatus 30 in accordance with the present invention, which carries out an interpolating operation for obtaining the interpolation image signal made up of a number of image signal components different from that of the image signal components of the original image signal Sorg when the image size is to be enlarged or reduced.

The original image signal Sorg used in this embodiment is made up of a series of digital image signal components $S_{k-2}, S_{k-1}, S_k, S_{k+1}, S_{k+2}, \ldots$ respectively corresponding to sampling points (picture elements) $X_{k-2}, X_{k-1}, X_k, X_{k+1}, X_{k+2}, \ldots$, which are sampled with a period of an equal interval and arrayed in one direction.

The interpolating operation apparatus 30, which is incorporated in the image processing apparatus 20, comprises a cubic spline interpolating operation means 31 for obtaining an interpolation signal SC by employing a cubic spline interpolating operation process with respect to the original image signal Sorg. The interpolating operation apparatus 30 also comprises a B spline interpolating operation means 32 for obtaining an interpolation signal SB by employing a B spline interpolating operation process with respect to the original image signal Sorg. The interpolating operation apparatus 30 further comprises an addition means 33 for calculating a difference signal ΔS (=SC−SB), which represents difference values between the interpolation signal SC and the interpolation signal SB, and a correction means 34 for correcting the difference signal ΔS in the manner, which will be described later, and thereby obtaining a correction signal ΔS'. The interpolating operation apparatus 30 still further comprises an addition means 35 for subtracting the correction signal ΔS' from the interpolation signal SC and thereby obtaining the final interpolation image signal S' (=SC−ΔS').

The cubic spline interpolating operation means 31 calculates the interpolation signal SC by employing the aforesaid cubic spline interpolating operation process with respect to the original image signal Sorg. Specifically, the cubic spline interpolating operation means 31 calculates interpolation coefficients $c_{k-1}, c_k, c_{k+1}$, and $c_{k+2}$, which respectively correspond to the original image signal components $Y_{k-1}, Y_k, Y_{k+1}$, and $Y_{k+2}$, in Formula (16) shown below. Formula (16) serves as a third-order cubic spline interpolating operation formula and represents an interpolated signal component Y' corresponding to an interpolation point $X_p$, which is located between original sampling points (picture elements) $X_k$ and $X_{k+1}$. The calculations are made with the formulas shown below.

$$Y'=c_{k-1}Y_{k-1}+C_kY_k+c_{k+1}Y_{k+1}+c_{k+2}Y_{k+2} \qquad (16)$$

$$c_{k-1}=(-t^3+2t^2-t)/2$$

$$c_k=(3t^3-5t^2+2)/2$$

$$c_{k+1}=(-3t^3+4t^2+t)/2$$

$$c_{k+2}=(t^3-t^2)/2$$

in which t, where $0 \leq t \leq 1$, represents the position of the interpolation point $X_p$, the position being taken with respect to the picture element $X_k$ that serves as a reference position, and in the direction heading toward the picture element $X_{k+1}$, the lattice interval being set to be equal to 1.

The B spline interpolating operation means 32 calculates the interpolation signal SB by employing the aforesaid B spline interpolating operation process with respect to the original image signal Sorg. Specifically, the B spline interpolating operation means 32 calculates interpolation coefficients $b_{k-1}, b_k, b_{k+1}$, and $b_{k+2}$, which respectively correspond to the original image signal components $Y_{k-1}, Y_k, Y_{k+1}$, and $Y_{k+2}$, in Formula (17) shown below. Formula (17) serves as a third-order B spline interpolating operation formula and represents an interpolated signal component Y' corresponding to the interpolation point $X_p$, which is located between the original sampling points $X_k$ and $X_{k+1}$. The calculations are made with the formulas shown below.

$$Y'=b_{k-1}Y_{k-1}+b_kY_k+b_{k+1}Y_{k+1}+b_{k+2}Y_{k+2} \qquad (17)$$

$$b_{k-1}=(-t^3+3t^2-3t+1)/6$$

$$b_k=(3t^3-6t^2+4)/6$$

$$b_{k+1}=(-3t^3+3t^2+3t+1)/6$$

$$b_{k+2}=t^3/6$$

in which t, where $0 \leq t \leq 1$, represents the position of the interpolation point $X_p$, the position being taken with respect to the picture element $X_k$ that serves as a reference position, and in the direction heading toward the picture element $X_{k+1}$, the lattice interval being set to be equal to 1.

An actual image is composed of the picture elements arrayed in two-dimensional directions. Therefore, the cubic spline interpolation coefficients $c_{k-1}, c_k, c_{k+1}$, and $c_{k+2}$ are calculated for each of two different directions (an i direction and a j direction) of an array of the picture elements in the image. The cubic spline interpolation coefficients $c_{k-1}, c_k, c_{k+1}$, and $c_{k+2}$ having been calculated in this manner are often represented as the interpolation coefficients Cij. The B spline interpolation coefficients $b_{k-1}, b_k, b_{k+1}$, and $b_{k+2}$, which have been calculated for each of the i direction and the j direction of the array of the picture elements in the image, are often represented as the interpolation coefficients Bij.

In the image reproducing system provided with this embodiment, the interpolation image signal S' obtained in the manner described above may be directly fed into the image reproducing means 40. Alternatively, the interval of the image signal components of the interpolation image signal S' may be extended such that the interval may become equal to the interval of the image signal components of the original image signal Sorg. In this manner, the interpolation image can be reproduced as an image enlarged from the original image.

The correction means 34 calculates the correction signal ΔS' in accordance with the difference signal ΔS, which represents the difference values between the interpolation signal SC and the interpolation signal SB. Specifically, the correction means 34 calculates the correction signal ΔS' in accordance with a correcting function shown in FIG. 2. With the correcting function, in cases where the absolute value of the difference signal ΔS is smaller than S1, the value of the difference signal ΔS is taken directly as the value of the correction signal ΔS', i.e., ΔS=ΔS'. Also, as the absolute value of the difference signal ΔS becomes larger than S1, the absolute value of the correction signal ΔS' is set to be small. Further, in cases where the absolute value of the difference signal ΔS becomes larger than a predetermined value, the value of the correction signal ΔS' is set to be 0.

Since the interpolation signal SC is calculated in accordance with the aforesaid cubic spline interpolating operation process, the interpolation signal SC is the one which yields a reproduced image having a comparatively high level of sharpness. Also, since the interpolation signal SB is calculated in accordance with the aforesaid B spline interpolating operation process, the interpolation signal SB is the one which yields a smooth reproduced image having a comparatively low level of sharpness. Therefore, the difference signal ΔS, which represents the difference values between the interpolation signal SC and the interpolation signal SB, takes a large value with respect to an image portion having a high level of sharpness, such as an edge portion in the image. Also, the difference signal ΔS takes a small value with respect to a smooth image portion. Accordingly, in cases where the difference signal ΔS is corrected in the correction means 34 and in accordance with the correcting function shown in FIG. 2, the correction signal ΔS' takes a value of 0 or a small value with respect to the image portion having a high level of sharpness and takes a value with respect to the smooth image portion, which value is larger than the value with respect to the image portion having a high level of sharpness.

How the image reproducing system provided with this embodiment operates will be described hereinbelow.

Firstly, the image processing apparatus 20 reads the original image signal Sorg from the image signal storing device 10. Also, in order to obtain the interpolation image signal S', which represents an enlarged image corresponding to the size of the photographic paper used in the image reproducing means 40, the image processing apparatus 20 feeds the original image signal Sorg into the interpolating operation apparatus 30 incorporated in the image processing apparatus 20.

In the interpolating operation apparatus 30, the original image signal Sorg is fed into the cubic spline interpolating operation means 31 and the B spline interpolating operation means 32. The cubic spline interpolating operation means 31 and the B spline interpolating operation means 32 set the values of t in the respective interpolation coefficients in accordance with the size of the photographic paper, which is used in the image reproducing means 40. For example, in cases where an image size enlargement scale factor of 2 is specified, values of 0.5 and 1.0 are set as the values of t. In cases where an image size enlargement scale factor of 4 is specified, values of 0.25, 0.5, 0.75, and 1.0 are set as the values of t. In cases where an image size enlargement scale factor of 10 is specified, values of 0.1, 0.2, . . . , 1.0 are set as the values of t. The interpolation signal SC and the interpolation signal SB are calculated in accordance with the thus set values of t. The interpolation signal SC, which has been obtained in the cubic spline interpolating operation means 31, and the interpolation signal SB, which has been obtained in the B spline interpolating operation means 32, are fed into the addition means 33. In the addition means 33, the difference signal ΔS, which represents the difference values between the interpolation signal SC and the interpolation signal SB, is calculated. The calculated difference signal ΔS is fed into the correction means 34.

In the correction means 34, the received difference signal ΔS is corrected in accordance with the correcting function shown in FIG. 2, and the correction signal ΔS' is thereby calculated. As described above, the difference signal ΔS takes a large value with respect to an image portion having a high level of sharpness, such as an edge portion in the image. Also, the difference signal ΔS takes a small value with respect to a smooth image portion, such as the pattern of a face of a person. Accordingly, in cases where the difference signal ΔS is corrected in accordance with the correcting function shown in FIG. 2, the correction signal ΔS' takes a value of 0 or a small value with respect to the image portion having a high level of sharpness and takes a value with respect to the smooth image portion, which value is larger than the value with respect to the image portion having a high level of sharpness.

The correction signal ΔS', which has been calculated in the correction means 34, is fed into the addition means 35. The addition means 35 calculates the difference values between the interpolation signal SC and the correction signal ΔS'. As illustrated in FIG. 3A, since the interpolation signal SC is calculated in accordance with the aforesaid cubic spline interpolating operation process, the interpolation signal SC is the one which yields a reproduced image having a comparatively high level of sharpness. However, as indicated by a portion B in FIG. 3A, the interpolation signal SC has the characteristics such that noise, such as graininess in a photograph, may be perceptible at a flesh-color portion, which should be smooth in the image. As illustrated in FIG. 3B, the correction signal ΔS' takes a value of 0 or a small value with respect to the image portion having a high level of sharpness (portions A, A in FIG. 3A) and takes a value with respect to the smooth image portion, which value is larger than the value with respect to the image portion having a high level of sharpness. Therefore, as illustrated in FIG. 3C, in the interpolation image signal S', which is obtained by subtracting the correction signal ΔS' from the interpolation signal SC, the values of the portions A, A having a high level of sharpness in the interpolation signal SC are retained, and noise at the portion B, which should be smooth, has been removed. The thus obtained interpolation image signal S' is fed into the image reproducing means 40.

The image reproducing means 40 reproduces a visible image from the received interpolation image signal S'. The visible image reproduced in this manner is the one, in which an edge portion, a fine design portion, and the like, have a comparatively high level of sharpness, and a portion, such as a portion corresponding to a flesh-color part of a person, is smooth and has a comparatively low level of sharpness. Therefore, the image size can be enlarged or reduced such that an image having appropriate levels of sharpness in accordance with different portions in the image can be reproduced.

A second embodiment of the interpolating operation apparatus for an image signal in accordance with the present invention will be described hereinbelow.

Figure 4:
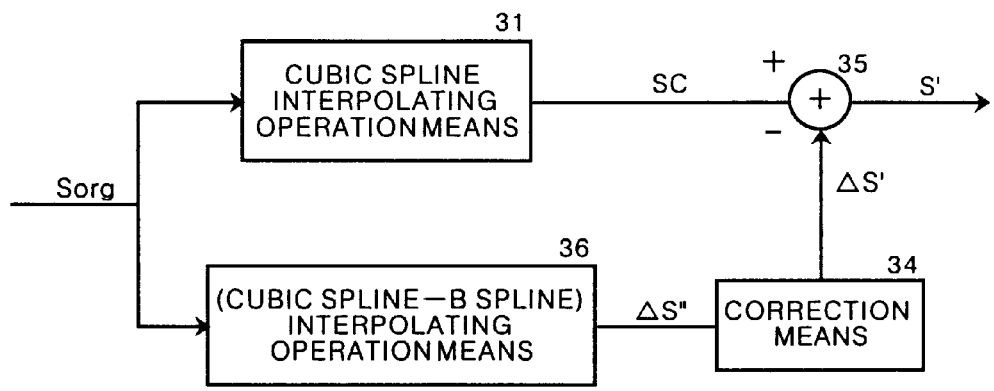
FIG. 4 is a block diagram showing a second embodiment of the interpolating operation apparatus for carrying out the interpolating operation method for an color image signal in accordance with the present invention.

FIG. 4 is a block diagram showing a second embodiment of the interpolating operation apparatus for carrying out the interpolating operation method for an image signal in accordance with the present invention. The second embodiment of the interpolating operation apparatus is incorporated in an image reproducing system in the same manner as that for the interpolating operation apparatus 30 shown in FIG. 1. In FIG. 4, the image signal storing device 10, the image processing apparatus 20, and the image reproducing means 40, which are illustrated in FIG. 1, are not shown. The second embodiment of FIG. 4 is the same as the interpolating operation apparatus 30 of FIG. 1, which is the first embodiment, except that a (cubic spline-B spline) interpolating operation means 36 is employed in lieu of the B spline interpolating operation means 32 and the addition means 33. The (cubic spline-B spline) interpolating operation means 36 calculates difference interpolation coefficients $d_{k-1}$, $d_k$, $d_{k+1}$, and $d_{k+2}$, which are the differences between the interpolation coefficients $c_{k-1}$, $c_k$, $c_{k+1}$, $c_{k+2}$ in Formula (16) serving as the cubic spline interpolating operation formula and the interpolation coefficients $b_{k-1}$, $b_k$, $b_{k+1}$, $b_{k+2}$ in Formula (17) serving as the B spline interpolating operation formula. Also, the (cubic spline—B spline) interpolating operation means 36 carries out an interpolating operation in accordance with the difference interpolation coefficients $d_{k-1}$, $d_k$, $d_{k+1}$, and $d_{k+2}$ and thereby obtains a difference interpolation signal ΔS".

As described above, in the (cubic spline-B spline) interpolating operation means 36, the differences between the interpolation coefficients $c_{k-1}$, $c_k$, $c_{k+1}$, $c_{k+2}$ in Formula (16), which serves as the cubic spline interpolating operation formula, and the interpolation coefficients $b_{k-1}$, $b_k$, $b_{k+1}$, $b_{k+2}$ in Formula (17), which serves as the B spline interpolating operation formula, are calculated as the difference interpolation coefficients $d_{k-1}$, $d_k$, $d_{k+1}$, and $d_{k+2}$. Also, the interpolating operation is carried out in accordance with the difference interpolation coefficients $d_{k-1}$, $d_k$, $d_{k+1}$, and $d_{k+2}$. Therefore, the thus obtained difference interpolation signal ΔS" takes values substantially identical with the values of the difference signal ΔS, which represents the differences between the interpolation signal SC and the interpolation signal SB and is obtained from the addition means 33 in the first embodiment described above.

The difference interpolation signal ΔS" is then corrected in the correction means 34, and a correction signal ΔS' is thereby obtained. Also, in the addition means 35, difference values between the interpolation signal SC and the correction signal ΔS' are calculated, and an interpolation image signal S' is thereby obtained. As in the first embodiment described above, as illustrated in FIG. 3C, in the interpolation image signal S', the values of the portions A, A having a high level of sharpness in the interpolation signal sC are retained, and noise at the portion B, which should be smooth, has been removed. Thereafter, in the image reproducing means 40, a visible image is reproduced from the interpolation image signal S'. The visible image reproduced in this manner is the one, in which an edge portion, a fine design portion, and the like, have a comparatively high level of sharpness, and a portion, such as a portion corresponding to a flesh-color part of a person, is smooth and has a comparatively low level of sharpness. Therefore, the image size can be enlarged or reduced such that an image having appropriate levels of sharpness in accordance with different portions in the image can be reproduced.

In the second embodiment, in the (cubic spline-B spline) interpolating operation means 36, the processing substantially identical with the processing carried out by the addition means 33 in the first embodiment can also be carried out simultaneously. Therefore, the constitution of the apparatus can be kept simple. Also, the time required for operations can be kept short, and the processing can be carried out quickly.

In the first and second embodiments described above, the correction signal ΔS' is subjected to the calculation with the interpolation signal SC, which has been calculated by the cubic spline interpolating operation means 31. Alternatively, a modification may be made such that the correction signal ΔS' may be subjected to the calculation with the interpolation signal SB, which has been calculated by the B spline interpolating operation means 32. In such cases, in the correction means 34, a correcting function reverse to the one shown in FIG. 2 may be employed. Specifically, the correcting function may be set such that the correcting function may take a value of 0 or a small value with respect to a portion, in which the signal value of the difference signal ΔS or ΔS" is small, and such that the correcting function may take a large value with respect to a portion, in which the signal value of the difference signal ΔS or ΔS" is large.

A third embodiment of the interpolating operation apparatus for an image signal in accordance with the present invention will be described hereinbelow.

Figure 5:
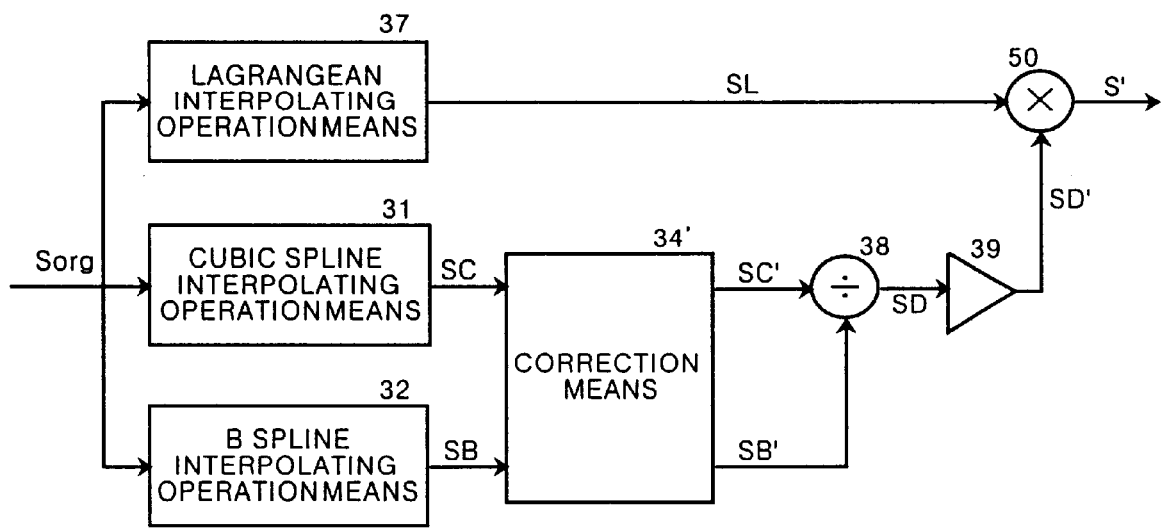
FIG. 5 is a block diagram showing a third embodiment of the interpolating operation apparatus for carrying out the interpolating operation method for an image signal in accordance with the present invention.

FIG. 5 is a block diagram showing a third embodiment of the interpolating operation apparatus for carrying out the interpolating operation method for an image signal in accordance with the present invention. The third embodiment of the interpolating operation apparatus is incorporated in an image reproducing system in the same manner as that for the interpolating operation apparatus 30 shown in FIG. 1. In FIG. 5, the image signal storing device 10, the image processing apparatus 20, and the image reproducing means 40, which are illustrated in FIG. 1, are not shown. As illustrated in FIG. 5, the third embodiment of the interpolating operation apparatus comprises a Lagrangean interpolating operation means 37 for carrying out an interpolating operation on the original image signal Sorg and in accordance with the known Lagrangean interpolating operation process and thereby obtaining an interpolation signal SL. The interpolating operation apparatus also comprises the cubic spline interpolating operation means 31 and the B spline interpolating operation means 32 for respectively calculating the interpolation signal SC and the interpolation signal SB in the same manner as that in the first embodiment described above. The interpolating operation apparatus further comprises a correction means 34' for correcting the interpolation signal SC and the interpolation signal SB and thereby obtaining corrected interpolation signals SC' and SB'. The interpolating operation apparatus still further comprises a division means 38 for dividing the corrected interpolation signal SC' by the corrected interpolation signal SB' and thereby obtaining a division signal SD. The interpolating operation apparatus also comprises an operation means 39 for obtaining a correction signal SD', which is to be used for the correction of the interpolation signal SL, from the division signal SD, and a multiplication means 50 for multiplying the interpolation signal SL by the correction signal SD'.

Figure 6:
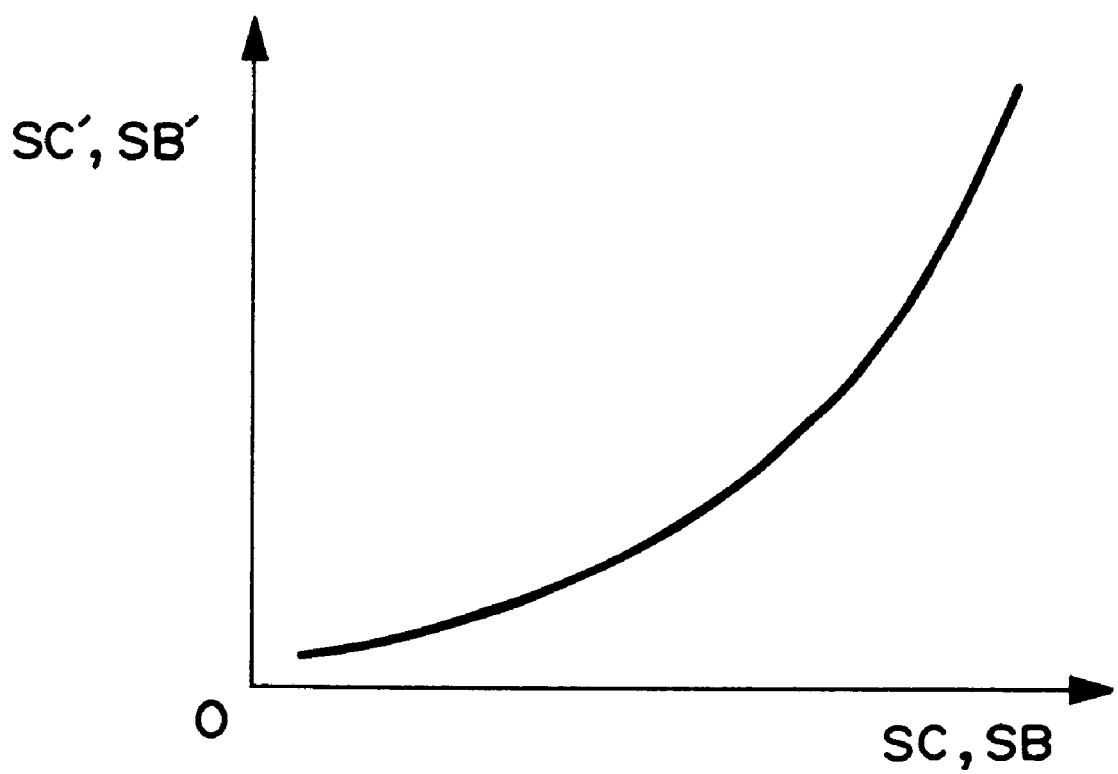
FIG. 6 is a graph showing a correcting function employed in the third embodiment.

The correction means 34' corrects the interpolation signal SC and the interpolation signal SB in accordance with a correcting function shown in FIG. 6. Specifically, with respect to a bright image portion, at which the signal values are large, differences in image density are visually more perceptible than at a dark image portion. Therefore, by the correction of the interpolation signal SC and the interpolation signal SB in accordance with the correcting function shown in FIG. 6, the bright image portion, at which the signal values are large, is emphasized.

The division means 38 divides the corrected interpolation signal SC' by the corrected interpolation signal SB' and thereby obtains the division signal SD. Since the interpolation signal SC is calculated in accordance with the aforesaid cubic spline interpolating operation process, the interpolation signal SC is the one which yields a reproduced image having a comparatively high level of sharpness. Also, since the interpolation signal SB is calculated in accordance with the aforesaid B spline interpolating operation process, the interpolation signal SB is the one which yields a smooth reproduced image having a comparatively low level of sharpness. Therefore, the division signal SD takes a value larger than 1 with respect to an image portion having a high level of sharpness, such as an edge portion in the image. Also, the division signal SD takes a value of approximately 1 with respect to a smooth image portion.

The operation means 39 calculates the correction signal SD', which is to be used for the correction of the interpolation signal SL, from the division signal SD. Specifically, the correction signal SD' is calculated by the operation means 39 such that the correction signal SD' may take a value smaller than 1 with respect to a value of the division signal SD close to 1 and may take a value larger than 1 with respect to a value of the division signal SD larger than 1.

How the third embodiment operates will be described hereinbelow.

The original image signal Sorg, which has been fed into the interpolating operation apparatus, is fed into the Lagrangean interpolating operation means 37, the cubic spline interpolating operation means 31, and the B spline interpolating operation means 32. In the Lagrangean interpolating operation means 37, the interpolation signal SL is calculated in accordance with the Lagrangean interpolating operation process. In the cubic spline interpolating operation means 31 and the B spline interpolating operation means 32, the interpolation signal SC and the interpolation signal SB are calculated in the same manner as that in the first embodiment described above. The interpolation signal SC and the interpolation signal SB are fed into the correction means 34' and corrected in accordance with the correcting function shown in FIG. 6. In this manner, the corrected interpolation signal SC' and the corrected interpolation signal SB' are calculated. The corrected interpolation signal SC' and the corrected interpolation signal SB' are fed into the division means 38, and the division signal SD (=SC'/SB') is calculated. The division signal SD takes a value larger than 1 with respect to an image portion having a high level of sharpness, such as an edge portion in the image. Also, the division signal SD takes a value of approximately 1 with respect to a smooth image portion. The division signal SD is fed into the operation means 39. The operation means 39 calculates the correction signal SD', which takes a value larger than 1 with respect to the image portion having a high level of sharpness, such as an edge portion in the image, and takes a value smaller than 1 with respect to the smooth image portion.

In the multiplication means 50, the interpolation signal SL is multiplied by the correction signal SD'. The interpolation signal SL is the one which yields a reproduced image having a level of sharpness that is not very high and not very low. By being multiplied by the correction signal SD', the interpolation signal SL is corrected such that the signal value may become small with respect to the smooth image portion and may become large with respect to an image portion having a comparatively high level of sharpness. Therefore, in the interpolation image signal S', which is obtained from the multiplication of the interpolation signal SL by the correction signal SD', the value of the interpolation signal SL with respect to the image portion, which should be smooth, has been reduced, and the value of the interpolation signal SL with respect to the image portion, which should have a high level of sharpness, has been emphasized. The thus obtained interpolation image signal S' is fed into the image reproducing means 40, and a visible image is reproduced from the interpolation image signal S'.

As described above, in the third embodiment, the visible image reproduced by the image reproducing means 40 is the one, in which an edge portion, a fine design portion, and the like, have a comparatively high level of sharpness, and a portion, such as a portion corresponding to a flesh-color part of a person, is smooth and has a comparatively low level of sharpness. Therefore, the image size can be enlarged or reduced such that an image having appropriate levels of sharpness in accordance with different portions in the image can be reproduced.

In the third embodiment, by the correction means 34', the correction with the correcting function shown in FIG. 6 is carried out on the interpolation signal SC and the interpolation signal SB. Alternatively, the correction with the correcting function shown in FIG. 6 may firstly be carried out on the original image signal Sorg, and thereafter the interpolating operations may be carried out by the cubic spline interpolating operation means 31 and the B spline interpolating operation means 32. Also, the correction need not necessarily be carried out.

A fourth embodiment of the interpolating operation apparatus for an image signal in accordance with the present invention will be described hereinbelow.

Figure 7:
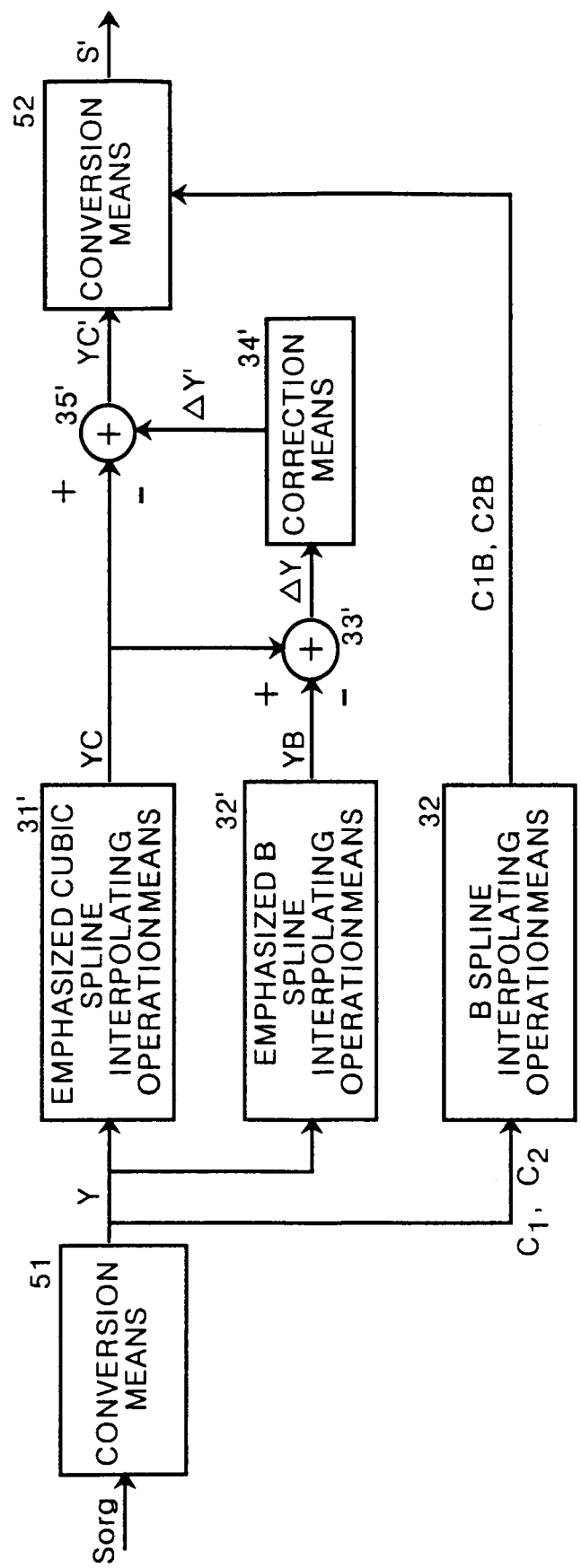
FIG. 7 is a block diagram showing a fourth embodiment of the interpolating operation apparatus for carrying out the interpolating operation method for an image signal in accordance with the present invention.

FIG. 7 is a block diagram showing a fourth embodiment of the interpolating operation apparatus for carrying out the interpolating operation method for an image signal in accordance with the present invention. The fourth embodiment of the interpolating operation apparatus is incorporated in an image reproducing system in the same manner as that for the interpolating operation apparatus 30 shown in FIG. 1. In FIG. 7, the image signal storing device 10, the image processing apparatus 20, and the image reproducing means 40, which are illustrated in FIG. 1, are not shown. The fourth embodiment of the interpolating operation apparatus carries out processing on, particularly, a color original image signal Sorg. The interpolating operation apparatus comprises a first conversion means 51 for converting R, G, and B color signal components, which represent each of the picture elements, into YCC luminance and color difference signal components with Formula (18) shown below.

$$Y = 0.299 \times R + 0.587 \times G + 0.114 \times B$$

$$C1 = -0.299 \times R - 0.587 \times G + 0.886 \times B$$

$$C2 = 0.70 \times R - 0.587 \times G - 0.114 \times B \tag{18}$$

The interpolating operation apparatus also comprises an emphasized cubic spline interpolating operation means 31' for obtaining an interpolated luminance signal component YC by employing an emphasized cubic spline interpolating operation process with respect to the luminance signal components Y, which are among the YCC luminance and color difference signal components having been obtained from the first conversion means 51. The interpolating operation apparatus further comprises an emphasized B spline interpolating operation means 32' for obtaining an interpolated luminance signal component YB by employing an emphasized B spline interpolating operation process with respect to the luminance signal components Y. The interpolating operation apparatus still further comprises the B spline interpolating operation means 32 for obtaining interpolated color difference signal components C1B and C2B, respectively, by employing the B spline interpolating operation process with respect to the color difference signal components C1 and C2, which are among the YCC luminance and color difference signal components having been obtained from the first conversion means 51. The interpolating operation apparatus also comprises an addition means 33' for calculating a difference signal component ΔY, which represents the difference between the interpolated luminance signal component YC and the interpolated luminance signal component YB. The interpolating operation apparatus further comprises the correction means 34' for correcting the difference signal component ΔY in the same manner as that in the first embodiment described above and thereby obtaining a correction signal component ΔY'. The interpolating operation apparatus still further comprises an addition means 35' for subtracting the correction signal component ΔY' from the interpolated luminance signal component YC and thereby obtaining an interpolated luminance signal component YC'. The interpolating operation apparatus also comprises a second conversion means 52 for converting the interpolated luminance signal component YC' and the interpolated color difference signal components C1B, C2B into interpolated color signal components R', G', and B' with Formula (19) shown below.

$$R' = YC' + C2B$$

$$G' = YC' - 0.194 \times C2B - 0.509 \times C2B$$

$$B' = YC' + C1B \quad (19)$$

As described in, for example, U.S. Ser. No. 08/679,830, each of the emphasized cubic spline interpolating operation means 31' and the emphasized B spline interpolating operation means 32' weights and adds the aforesaid interpolation coefficients $c_{k-1}$, $c_k$, $c_{k+1}$, and $c_{k+2}$ and the aforesaid interpolation coefficients $b_{k-1}$, $b_k$, $b_{k+1}$, and $b_{k+2}$, which coefficients correspond to each other and are set for the respective original image signal components $Y_{k-1}$, $Y_k$, $Y_{k+1}$, and $Y_{k+2}$. The weighted additions are carried out with Formulas (20), (21), (22), and (23) shown below. In this manner, interpolation coefficients $a_{k-1}$, $a_k$, $a_{k+1}$, and $a_{k+2}$ are determined. Also, the interpolating operation is carried out in accordance with the interpolation coefficients $a_{k-1}$, $a_k$, $a_{k+1}$, and $a_{k+2}$.

$$a_{k-1} = (1-\alpha)c_{k-1} + \alpha b_{k-1} \quad (20)$$
$$= \{(2\alpha-3)t^3 - (3\alpha-6)t^2 - 3t + \alpha\}/6$$

$$a_k = (1-\alpha)c_k + \alpha b_k \quad (21)$$
$$= \{(9-6\alpha)t^3 + (9\alpha-15)t^2 + (6-2\alpha)\}/6$$

$$a_{k+1} = (1-\alpha)c_{k+1} + \alpha b_{k+1} \quad (22)$$
$$= \{(6\alpha-9)t^3 - (9\alpha-12)t^2 + 3t + \alpha\}/6$$

$$a_{k+2} = (1-\alpha)c_{k+2} + \alpha b_{k+2} \quad (23)$$
$$= \{(3-2\alpha)t^3 + (3\alpha-3)t^2\}/6$$

In the emphasized cubic spline interpolating operation means 31', the value of the parameter α is set to be smaller than 0, such that an interpolation image having a higher level of sharpness than an image obtained with the ordinary cubic spline interpolating operation process may be obtained. In the emphasized B spline interpolating operation means 32', the value of the parameter α is set to be larger than 1, such that a smoother interpolation image than an image obtained with the ordinary B spline interpolating operation process may be obtained.

How the fourth embodiment operates will be described hereinbelow.

Firstly, the original image signal Sorg is fed into the first conversion means 51. In the first conversion means 51, the R, G, and B color signal components, which represent each of the picture elements in the original color image, are converted into the luminance signal component Y and the color difference signal components C1, C2 in accordance with Formula (18) shown above. In this manner, the luminance signal components Y and the color difference signal components C1, C2, which correspond to the picture elements in the original color image, are obtained. Thereafter, the luminance signal components Y are fed into the emphasized cubic spline interpolating operation means 31' and the emphasized B spline interpolating operation means 32'. The color difference signal components C1, C2 are fed into the B spline interpolating operation means 32.

In the emphasized cubic spline interpolating operation means 31' and the emphasized B spline interpolating operation means 32', the interpolating operations are carried out on the luminance signal components Y and in accordance with the interpolation coefficients $a_{k-1}$, $a_k$, $a_{k+1}$, and $a_{k+2}$, which have been calculated with Formulas (20), (21), (22), and (23) shown above, and the parameter α. The interpolated luminance signal components YC and the interpolated luminance signal components YB are thereby obtained. Also, in the B spline interpolating operation means 32, the interpolating operations are carried out on the color difference signal components C1 and the color difference signal components C2, respectively, and in accordance with the B spline interpolating operation process in the same manner as that in the first embodiment described above. The interpolated color difference signal components C1B and the interpolated color difference signal components C2B are thereby obtained.

The interpolated luminance signal components YC and the interpolated luminance signal components YB are processed in the addition means 33', the correction means 34', and the addition means 35' in the same manner as that in the first embodiment described above, and the interpolated luminance signal components YC' are thereby obtained from the addition means 35'. The interpolated luminance signal components YC', the interpolated color difference signal components C1B, and the interpolated color difference signal components C2B are fed into the second conversion means 52 and are converted into the interpolated color signal components R', G', and B' in accordance with Formula (19) shown above.

The interpolated color signal components R', G', and B', which have been obtained in the interpolating operation apparatus, serve as the color signal components in the interpolation image signal S'. The interpolation image signal S' is fed into the image reproducing means 40 and used for reproducing a visible image.

As described above, in the fourth embodiment, with respect to the luminance signal components Y, the interpolating operations are carried out in the same manner as that in the first embodiment described above. Therefore, with respect to the luminance signal components Y, the image has the characteristics such that an edge portion, a fine design portion, and the like, may have a comparatively high level of sharpness, and such that a portion, such as a portion corresponding to a flesh-color part of a person, may be smooth and may have a comparatively low level of sharpness. Also, with respect to the color difference signal components C1 and the color difference signal components C2, the image has the characteristics such that it may smooth. Therefore, the problems can be prevented from occurring in that deviations in hue occur to different directions and in different amounts at the respective picture elements in the visible image, which is obtained from the interpolating operation, due to the conventional technique, wherein an interpolated color signal component is calculated with the interpolating operation process, which attaches importance to sharpness, with respect to each of the R, G, and B color signal components. Further, since the sense of sight of persons is very sensitive to luminance signal components and is not very sensitive to color difference signal components, the image sharpness depends upon a change in luminance. With the fourth embodiment, wherein the interpolating operations are carried out with respect to the luminance signal components Y in the same manner as that in the first embodiment described above, a reproduced image can be obtained from the interpolation image signal S' such that an edge portion, a fine design portion, and the like, in the image may have a comparatively high level of sharpness, and such that an image portion, such as a portion corresponding to a flesh-color part of a person, may be smooth and may have a comparatively low level of sharpness.

In the fourth embodiment described above, the interpolating operations are carried out on the luminance signal components Y by the emphasized cubic spline interpolating operation means 31' and the emphasized B spline interpolating operation means 32'. Alternatively, the interpolating operations on the luminance signal components Y may be carried out by the cubic spline interpolating operation means 31 and the B spline interpolating operation means 32, which are employed in the first embodiment described above. As another alternative, the interpolating operations may be carried out in the same manner as that in the second embodiment or the third embodiment described above.

Also, in the first, second, and third embodiments described above, the interpolating operations are carried out by the cubic spline interpolating operation means 31 and the B spline interpolating operation means 32 [or the (cubic spline-B spline) interpolating operation means 36]. Alternatively, in the first, second, and third embodiments described above, the interpolating operations may be carried out by the emphasized cubic spline interpolating operation means 31' and the emphasized B spline interpolating operation means 32' as in the fourth embodiment.

Further, in the fourth embodiment described above, the correction signal component ΔY' is subjected to the calculation with the interpolated luminance signal component YC, which has been calculated by the emphasized cubic spline interpolating operation means 31'. Alternatively, the correction signal component ΔY' may be subjected to the calculation with the interpolated luminance signal component YB, which has been calculated by the emphasized B spline interpolating operation means 32'.

In the fourth embodiment, as the signal components in the luminance-color difference space, the YCC luminance and color difference signal components are employed. Alternatively, luminance and color difference signal components, which are represented by L*a*b*, L*u*v*, or the like, may be employed.

In the embodiments described above, the interpolating operation apparatus utilizes the original image signal Sorg having been previously stored in the image signal storing device 10. However, the interpolating operation apparatus in accordance with the present invention is not limited to these embodiments. For example, an image signal representing an image, which has been detected by using an image read-out apparatus, may be utilized.

A fifth embodiment of the interpolating operation apparatus for an image signal in accordance with the present invention will be described hereinbelow.

Figure 8:
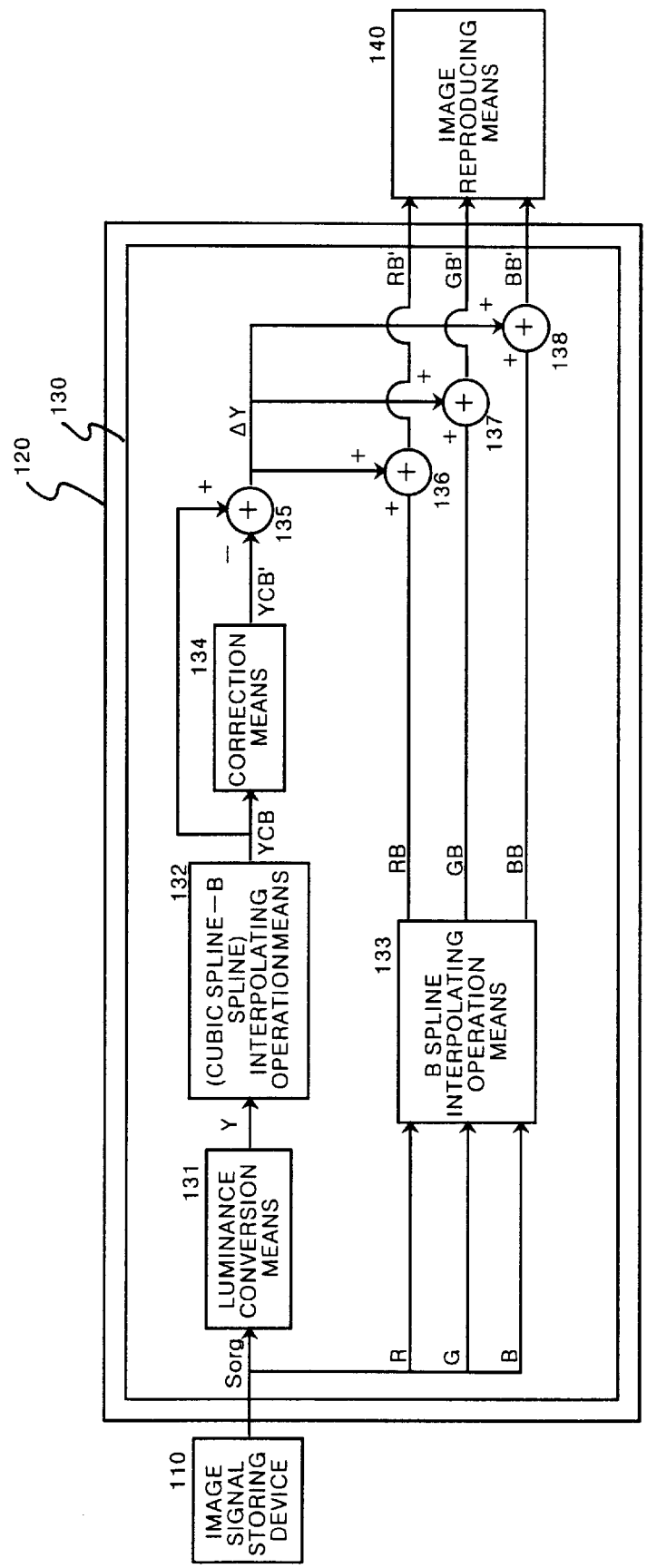
FIG. 8 is a block diagram showing an image reproducing system provided with a fifth embodiment of the interpolating operation apparatus for carrying out the interpolating operation method for an image signal in accordance with the present invention.

FIG. 8 is a block diagram showing an image reproducing system provided with an interpolating operation apparatus 130, which is a fifth embodiment of the interpolating operation apparatus for carrying out the interpolating operation method for an image signal in accordance with the present invention. As illustrated in FIG. 8, the image reproducing system, which is provided with the interpolating operation apparatus 130 serving as the fifth embodiment, comprises an image signal storing device 110 for storing an image signal representing an image, and an image processing apparatus 120 for carrying out predetermined signal processing on the color original image signal Sorg, which is received from the image signal storing device 110, such that an image signal conforming to a predetermined reproduction size may be obtained. The image reproducing system also comprises an image reproducing means 140 for reproducing a visible image of the predetermined reproduction size from an interpolation image signal S', which has been obtained from the predetermined signal processing carried out by the image processing apparatus 120. The image reproducing means 140 may be a CRT display device, a printer, or the like.

The image processing apparatus 120 carries out the signal processing on the original image signal Sorg, such that an image signal conforming to, for example, one of various sizes (an L size, a postcard size, an A4 size, and the like) of photographic paper for image reproduction may be obtained. The image processing apparatus 120 is provided with the interpolating operation apparatus 130 serving as the fifth embodiment in accordance with the present invention, which carries out an interpolating operation for obtaining the interpolation image signal made up of a number of image signal components different from that of the image signal components of the original image signal Sorg when the image size is to be enlarged or reduced.

The original image signal Sorg used in this embodiment is made up of a series of digital image signal components $S_{k-2}, S_{k-1}, S_k, S_{k+1}, S_{k+2}, \ldots$ respectively corresponding to sampling points (picture elements) $X_{k-2}, X_{k-1}, X_k, X_{k+1}, X_{k+2}, \ldots$, which are sampled with a period of an equal interval and arrayed in one direction.

The interpolating operation apparatus 130, which serves as the fifth embodiment and is incorporated in the image processing apparatus 120, comprises a luminance conversion means 131 for obtaining a luminance signal component Y from the R, G, and B color signal components, which represent each of the picture elements in the original color image represented by the original image signal Sorg, with Formula (24) shown below.

$$Y=0.299\times R+0.587\times G+0.114\times B \tag{24}$$

The interpolating operation apparatus 130 also comprises a (cubic spline-B spline) interpolating operation means 132. The (cubic spline-B spline) interpolating operation means 132 calculates difference interpolation coefficients, which are the differences between the interpolation coefficients in a cubic spline interpolating operation formula shown below and the interpolation coefficients in a B spline interpolating operation formula shown below. Also, the (cubic spline-B spline) interpolating operation means 132 carries out an interpolating operation in accordance with the difference interpolation coefficients and thereby obtains an interpolated luminance signal component YCB. The interpolating operation apparatus 130 further comprises a B spline interpolating operation means 133 for carrying out the B spline interpolating operation process on each of the R color signal components, the G color signal components, and the B color signal components, which constitute the original image signal Sorg, and thereby obtaining interpolated signal components RB, GB, and BB. The interpolating operation apparatus 130 still further comprises a correction means 134 for correcting the interpolated luminance signal component YCB in the manner described later and thereby obtaining a corrected luminance signal component YCB'. The interpolating operation apparatus 130 also comprises an addition means 135 for calculating a difference luminance signal component $\Delta Y$ (=YCB−YCB'), which represents the difference value between the interpolated luminance signal component YCB and the corrected luminance signal component YCB'. The interpolating operation apparatus 130 further comprises addition means 136, 137, and 138 for adding the difference luminance signal component $\Delta Y$ to the interpolated signal components RB, GB, and BB and thereby obtaining interpolated signal components RB', GB', and BB'. In this manner, a final interpolation image signal S', which is composed of the thus obtained interpolated signal components RB', GB', and BB', is obtained.

The cubic spline interpolating operation process and the B spline interpolating operation process will be described hereinbelow. In the cubic spline interpolating operation process, specifically, calculations are made to find interpolation coefficients $c_{k-1}$, $c_k$, $c_{k+1}$, and $c_{k+2}$, which respectively correspond to the original image signal components $Z_{k-1}$, $Z_k$, $Z_{k+1}$ and $Z_{k+2}$, in Formula (25) shown below. Formula (25) serves as a third-order cubic spline interpolating operation formula and represents an interpolated signal component $Z_{cp}'$ corresponding to an interpolation point $X_p$, which is located between original sampling points (picture elements) $X_k$ and $X_{k+1}$. The calculations are made with the formulas shown below.

$$Z_{cp}'=c_{k-1}Z_{k-1}+c_kZ_k+c_{k+1}Z_{k+1}+C_{k+2}Z_{k+2} \quad (25)$$

$$c_{k-1}=(-t^3+2t^2-t)/2$$

$$c_k=(3t^3-5t^2+2)/2$$

$$c_{k+1}=(-3t^3+4t^2+t)/2$$

$$c_{k+2}=(t^3-t^2)/2$$

in which t, where $0 \leq t \leq 1$, represents the position of the interpolation point $X_p$, the position being taken with respect to the picture element $X_k$ that serves as a reference position, and in the direction heading toward the picture element $X_{k+1}$, the lattice interval being set to be equal to 1.

In the B spline interpolating operation process, specifically, calculations are made to find interpolation coefficients $b_{k-1}$, $b_k$, $b_{k+1}$, and $b_{k+2}$, which respectively correspond to the original image signal components $Z_{k-1}$, $Z_k$, $Z_{k+1}$, and $Z_{k+2}$, in Formula (26) shown below. Formula (26) serves as a third-order B spline interpolating operation formula and represents an interpolated signal component $Z_{cb}'$ corresponding to the interpolation point $X_p$, which is located between the original sampling points $X_k$ and $X_{k+1}$. The calculations are made with the formulas shown below.

$$Z_{cb}'=b_{k-1}Z_{k-1}+b_kZ_k+b_{k+1}Z_{k+1}+b_{k+2}Z_{k+2} \quad (26)$$

$$b_{k-1}=(-t^3+3t^2-3t+1)/6$$

$$b_k=(3t^3-6t^2+4)/6$$

$$b_{k+1}=(-3t^3+3t^2+3t+1)/6$$

$$b_{k+2}=t^3/6$$

in which t, where $0 \leq t \leq 1$, represents the position of the interpolation point $X_p$, the position being taken with respect to the picture element $X_k$ that serves as a reference position, and in the direction heading toward the picture element $X_{k+1}$, the lattice interval being set to be equal to 1.

In the (cubic spline-B spline) interpolating operation means 132, the differences between the interpolation coefficients $c_{k-1}$, $c_k$, $c_{k+1}$, $c_{k+2}$ in Formula (25), which serves as the cubic spline interpolating operation formula, and the interpolation coefficients $b_{k-1}$, $b_k$, $b_{k+1}$, $b_{k+2}$ in Formula (26), which serves as the B spline interpolating operation formula, are calculated as difference interpolation coefficients $d_{k-1}$, $d_k$, $d_{k+1}$, and $d_{k+2}$. Also, the interpolating operation is carried out in accordance with the difference interpolation coefficients $d_{k-1}$, $d_k$, $d_{k+1}$, and $d_{k+2}$, and the interpolated luminance signal component YCB is thereby obtained. The thus obtained interpolated luminance signal component YCB takes a value substantially identical with the value of the difference signal component representing the difference between an interpolated signal component, which is obtained by carrying out the cubic spline interpolating operation process on the luminance signal components Y, and an interpolated signal component, which is obtained by carrying out the B spline interpolating operation process on the luminance signal components Y.

An actual image is composed of the picture elements arrayed in two-dimensional directions. Therefore, the cubic spline interpolation coefficients $c_{k-1}$, $c_k$, $c_{k+1}$, and $c_{k+2}$ are calculated for each of two different directions (an i direction and a j direction) of an array of the picture elements in the image. Also, the B spline interpolation coefficients $b_{k-1}$, $b_k$, $b_{k+1}$, and $b_{k+2}$ are calculated for each of the i direction and the j direction of the array of the picture elements in the image. Further, the difference interpolation coefficients $d_{k-1}$, $d_k$, $d_{k+1}$, and $d_{k+2}$ are calculated for each of the i direction and the j direction of the array of the picture elements in the image.

In the image reproducing system provided with this embodiment, the interpolation image signal S' obtained in the manner described above may be directly fed into the image reproducing means 140. Alternatively, the interval of the image signal components of the interpolation image signal S' may be extended such that the interval may become equal to the interval of the image signal components of the original image signal Sorg. In this manner, the interpolation image can be reproduced as an image enlarged from the original image.

The correction means 134 calculates the corrected luminance signal components YCB' in accordance with the interpolated luminance signal components YCB. Specifically, the correction means 134 calculates the corrected luminance signal components YCB' in accordance with a correcting function shown in FIG. 9. With the correcting function, in cases where the absolute values of the interpolated luminance signal components YCB are smaller than SI, the values of the interpolated luminance signal components YCB are taken directly as the values of the corrected luminance signal components YCB', i.e., YCB=YCB'. Also, as the absolute values of the interpolated luminance signal components YCB become larger than S1, the absolute values of the corrected luminance signal components YCB' are set to be small. Further, in cases where the absolute values of the interpolated luminance signal components YCB become larger than a predetermined value, the values of the corrected luminance signal components YCB' are set to be 0.

Since the interpolated luminance signal components YCB are obtained from the interpolating operation carried out in accordance with the difference interpolation coefficients representing the differences between the interpolation coefficients in the cubic spline interpolating operation process, which yields a reproduced image having a comparatively high level of sharpness, and the interpolation coefficients in the B spline interpolating operation process, which yields a smooth reproduced image having a comparatively low level of sharpness. Therefore, the interpolated luminance signal components YCB take a large value with respect to an image portion having a high level of sharpness, such as an edge portion in the image. Also, the interpolated luminance signal components YCB take a small value with respect to a smooth image portion. Accordingly, in cases where the interpolated luminance signal components YCB are corrected in the correction means 134 and in accordance with the correcting function shown in FIG. 9, the corrected luminance signal components YCB' take a value of 0 or a small value with respect to the image portion having a high level of sharpness and take a value with respect to the smooth image portion, which value is larger than the value with respect to the image portion having a high level of sharpness.

How the image reproducing system provided with the fifth embodiment of FIG. 8 operates will be described hereinbelow.

Firstly, the image processing apparatus 120 reads the original image signal Sorg from the image signal storing device 110. Also, in order to obtain the interpolation image signal S', which represents an enlarged image corresponding to the size of the photographic paper used in the image reproducing means 140, the image processing apparatus 120 feeds the original image signal Sorg into the interpolating operation apparatus 130 incorporated in the image processing apparatus 120.

In the interpolating operation apparatus 130, the original image signal Sorg is fed into the luminance conversion means 131 and the B spline interpolating operation means 133. In the luminance conversion means 131, the luminance signal component Y is obtained from the R, G, and B color signal components, which represent each of the picture elements in the original color image represented by the original image signal Sorg, with Formula (24) shown above. The B spline interpolating operation means 133 sets the values of t in the respective interpolation coefficients in accordance with the size of the photographic paper, which is used in the image reproducing means 140. For example, in cases where an image size enlargement scale factor of 2 is specified, values of 0.5 and 1.0 are set as the values of t. In cases where an image size enlargement scale factor of 4 is specified, values of 0.25, 0.5, 0.75, and 1.0 are set as the values of t. In cases where an image size enlargement scale factor of 10 is specified, values of 0.1, 0.2, . . . , 1.0 are set as the values of t. The interpolated signal components RB, GB, and BB are calculated in accordance with the thus set values of t.

The luminance signal components Y, which have been obtained in the manner described above, are fed into the (cubic spline-B spline) interpolating operation means 132. As in the B spline interpolating operation means 133, the (cubic spline-B spline) interpolating operation means 132 sets the values of t in the respective interpolation coefficients in accordance with the size of the photographic paper, which is used in the image reproducing means 140. The interpolated luminance signal components YCB are calculated in accordance with the thus set values of t. The interpolated luminance signal components YCB having thus been obtained are fed into the correction means 134.

Figure 9:
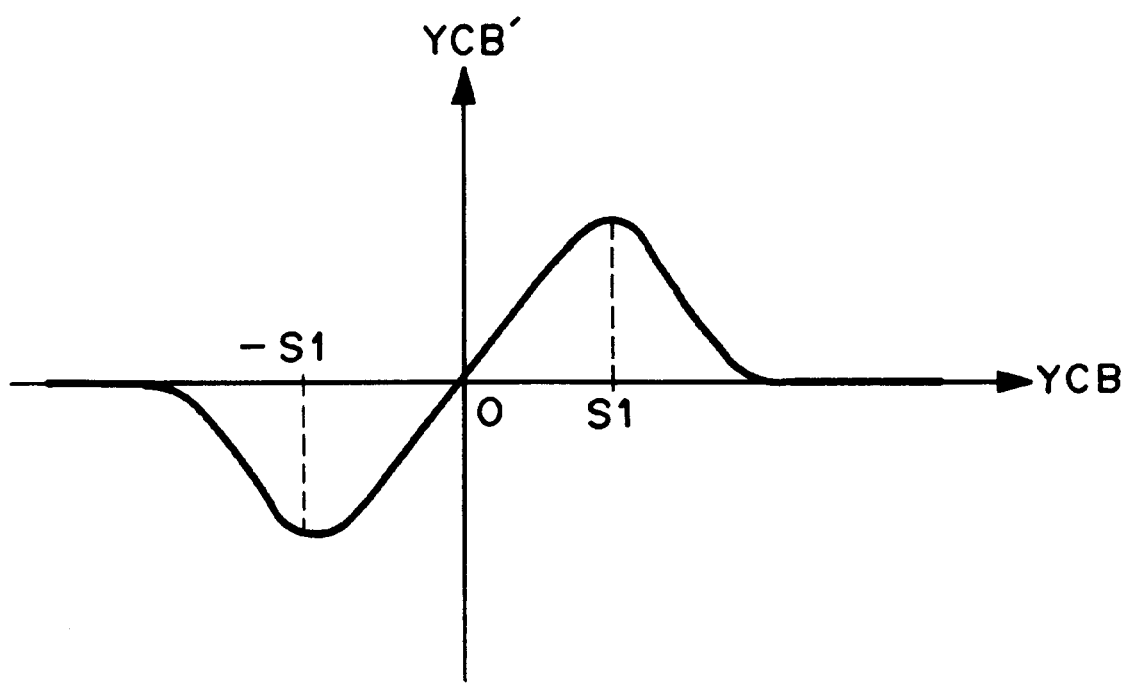
FIG. 9 is a graph showing a correcting function.

In the correction means 134, the received interpolated luminance signal components YCB are corrected in accordance with the correcting function shown in FIG. 9, and the corrected luminance signal components YCB' are thereby calculated. As described above, the interpolated luminance signal components YCB take a large value with respect to an image portion having a high level of sharpness, such as an edge portion in the image. Also, the interpolated luminance signal components YCB take a small value with respect to a smooth image portion, such as the pattern of a face of a person. Accordingly, in cases where the interpolated luminance signal components YCB are corrected in accordance with the correcting function shown in FIG. 9, the corrected luminance signal components YCB' take a value of 0 or a small value with respect to the image portion having a high level of sharpness and take a value with respect to the smooth image portion, which value is larger than the value with respect to the image portion having a high level of sharpness.

The corrected luminance signal components YCB', which have been calculated in the correction means 134, is fed into the addition means 135. The addition means 135 calculates the difference luminance signal components $\Delta Y$, which represent the difference values between the interpolated luminance signal components YCB and the corrected luminance signal components YCB'. As illustrated in FIG. 3A, since the interpolated luminance signal components YCB are calculated in accordance with the difference between the cubic spline interpolating operation process and the B spline interpolating operation process, the interpolated luminance signal components YCB constitute a luminance signal, which yields a reproduced image having a comparatively high level of sharpness. However, as indicated by a portion B in FIG. 3A, the interpolated luminance signal components YCB contain noise having a small value, such as graininess in a photograph, at a flesh-color portion, which should be smooth in the image. As illustrated in FIG. 3B, the corrected luminance signal components YCB' take a value of 0 or a small value with respect to the image portion having a high level of sharpness (portions A, A in FIG. 3A) and take a value with respect to the smooth image portion, which value is larger than the value with respect to the image portion having a high level of sharpness. Therefore, as illustrated in FIG. 3C, in the difference luminance signal components $\Delta Y$, which are obtained by subtracting the corrected luminance signal components YCB' from the interpolated luminance signal components YCB, the values of the portions A, A having a high level of sharpness in the interpolated luminance signal components YCB are retained, and noise at the portion B, which should be smooth, has been removed. Specifically, the difference luminance signal components $\Delta Y$ represent only the edge components in the luminance signal components Y.

In the addition means 136, 137, and 138, the thus obtained difference luminance signal components $\Delta Y$ are added to the interpolated signal components RB, GB, and BB. The interpolated signal components RB', GB', and BB' are thereby obtained. In this manner, the interpolation image signal S', which is composed of the thus obtained interpolated signal components RB', GB', and BB', is obtained. The thus obtained interpolation image signal S' is fed into the image reproducing means 140.

The image reproducing means 140 reproduces a visible image from the received interpolation image signal S'. The visible image reproduced in this manner is the one, in which an edge portion, a fine design portion, and the like, have a comparatively high level of sharpness, and a portion, such as a portion corresponding to a flesh-color part of a person, is smooth and has a comparatively low level of sharpness. Therefore, the image size can be enlarged or reduced such that an image having appropriate levels of sharpness in accordance with different portions in the image can be reproduced.

Figure 10:
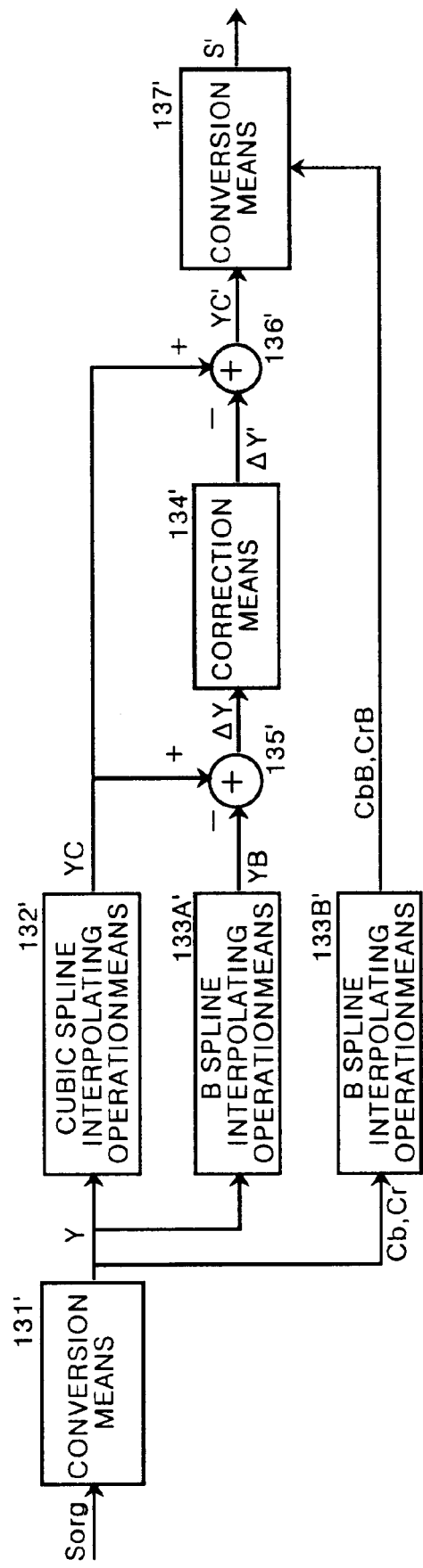
FIG. 10 is a block diagram showing an interpolating operation apparatus for an image signal, which is taken for comparison with the fifth embodiment.

A comparison between the fifth embodiment of the interpolating operation apparatus in accordance with the present invention and an interpolating operation apparatus for comparison will be made hereinbelow. FIG. 10 shows an interpolating operation apparatus, which is taken for comparison with the fifth embodiment. The interpolating operation apparatus for comparison, which is shown in FIG. 10, comprises a first conversion means 131' for converting R, G, and B color signal components, which represent each of the picture elements, into YCC luminance and color difference signal components with Formula (27) shown below.

$$Y=0.299 \times R+0.587 \times G+0.114 \times B$$

$$Cb=-0.299 \times R-0.587 \times G+0.886 \times B$$

$$Cr=0.701 \times R-0.587 \times G-0.114 \times B \quad (27)$$

The interpolating operation apparatus for comparison also comprises a cubic spline interpolating operation means 132' for obtaining an interpolated luminance signal component YC by employing a cubic spline interpolating operation process with respect to the luminance signal components Y, which are among the YCC luminance and color difference signal components having been obtained from the first conversion means 131'. The interpolating operation apparatus for comparison further comprises a B spline interpolating operation means 133A' for obtaining an interpolated luminance signal component YB by employing a B spline interpolating operation process with respect to the luminance signal components Y. The interpolating operation apparatus for comparison still further comprises a B spline interpolating operation means 133B' for obtaining interpolated color difference signal components CbB and CrB, respectively, by employing the B spline interpolating operation process with respect to the color difference signal components Cb and Cr, which are among the YCC luminance and color difference signal components having been obtained from the first conversion means 131'. The interpolating operation apparatus for comparison also comprises an addition means 135' for calculating a difference signal component $\Delta Y$, which represents the difference between the interpolated luminance signal component YC and the interpolated luminance signal component YB. The interpolating operation apparatus for comparison further comprises a correction means 134' for correcting the difference signal component $\Delta Y$ as in the fifth embodiment described above and thereby obtaining a correction signal component $\Delta Y'$. The interpolating operation apparatus for comparison still further comprises an addition means 135' for subtracting the correction signal component $\Delta Y'$ from the interpolated luminance signal component YC and thereby obtaining an interpolated luminance signal component YC'. The interpolating operation apparatus for comparison also comprises a second conversion means 137' for converting the interpolated luminance signal component YC' and the interpolated color difference signal components CbB, CrB into interpolated color signal components R', G', and B' with Formula (28) shown below.

$$R'=YC'+CrB$$

$$G'=YC'-0.194 \times CrB-0.509 \times CrB$$

$$B'=YC'+CbB \quad (28)$$

Figure 11:
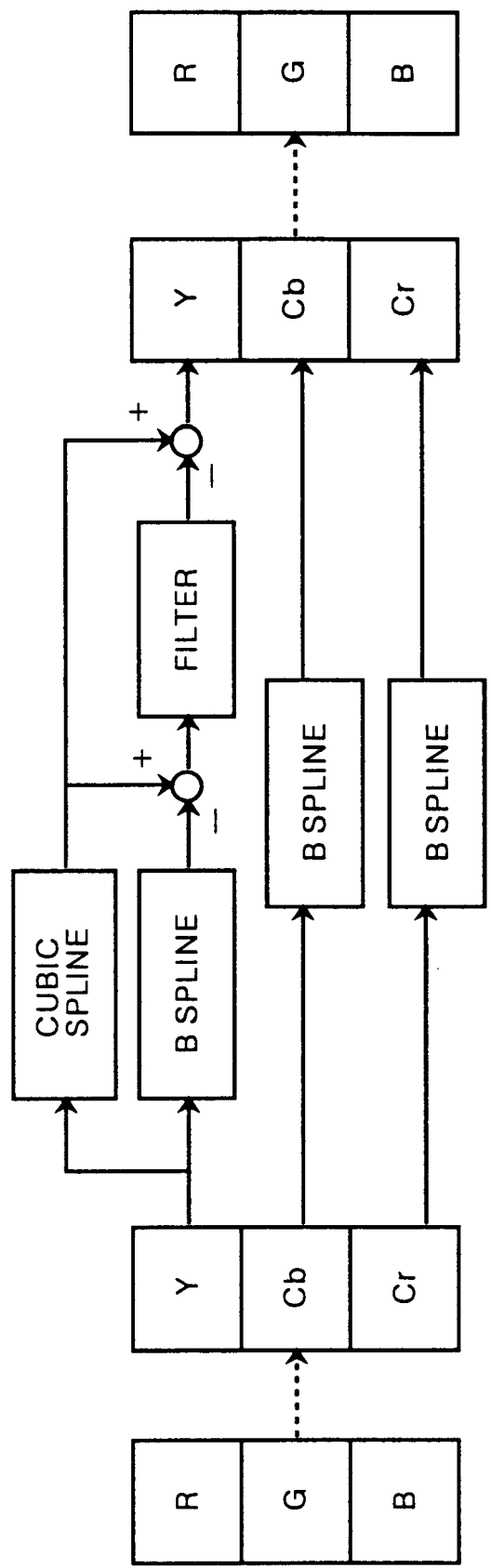
FIG. 11 is a flow chart showing a signal flow in the interpolating operation apparatus for an image signal shown in FIG. 10.

FIG. 11 is a flow chart showing a signal flow in the interpolating operation apparatus for comparison shown in FIG. 10. In FIG. 11, the processing carried out in the correction means 134' is represented by the "filter." Also, an input-output function of the filter is represented by F. In FIG. 11, with respect to the luminance signal components, which have been obtained by converting the original image signal Sorg from the R, G, and B color signal components into the YCC luminance and color difference signal components, the luminance values of the original image signal at the picture elements $X_{k-1}$, $X_k$, $X_{k+1}$, and $X_{k+2}$ may be represented respectively by $Y_{k-1}$, $Y_k$, $Y_{k+1}$ and $Y_{k+2}$. In such cases, an interpolated luminance signal component $Y_p$ at a picture element $X_p$ may be represented by Formula (29) shown below.

$$
\begin{aligned}
Y_p &= \text{(cubic spline interpolating operation)} - \\
&\quad F[\text{(cubic spline interpolating operation)} - \\
&\quad (B \text{ spline interpolating operation})] \\
&= \sum_{i=-1}^{Z} c_{k+i} Y_{k+i} - F\left[\sum_{i=-1}^{Z} c_{k+i} Y_{k+i} - \sum_{i=-1}^{Z} b_{k+i} Y_{k+i}\right] \\
&= c_k^T Y_k - F(c_k^T Y_k - b_k^T Y_k) \\
&= c_k^T Y_k - b_k^T Y_k - F(c_k^T Y_k - b_k^T Y_k) + b_k^T Y_k \\
&= (1-F)(c_k^T Y_k - b_k^T Y_k) + b_k^T Y_k
\end{aligned}
\quad (29)
$$

In Formula (29), I represents the input-output function of the filter, which directly outputs the input signal as the output signal. Also, $c_k^T$, $b_k^T$, and $Y_k$ represent the following:

$$c_k^T = (C_{k-1} c_k c_{k+1} c_{k+2})$$

Interpolation coefficient vector in cubic spline interpolating operation process $$b_k^T = (b_{k-1} b_k b_{k+1} b_{k+2})$$

Interpolation coefficient vector in third-order B spline interpolating operation process $$Y_k^T = (Y_{k-1} Y_k Y_{k+1} Y_{k+2})$$

Figure 12:
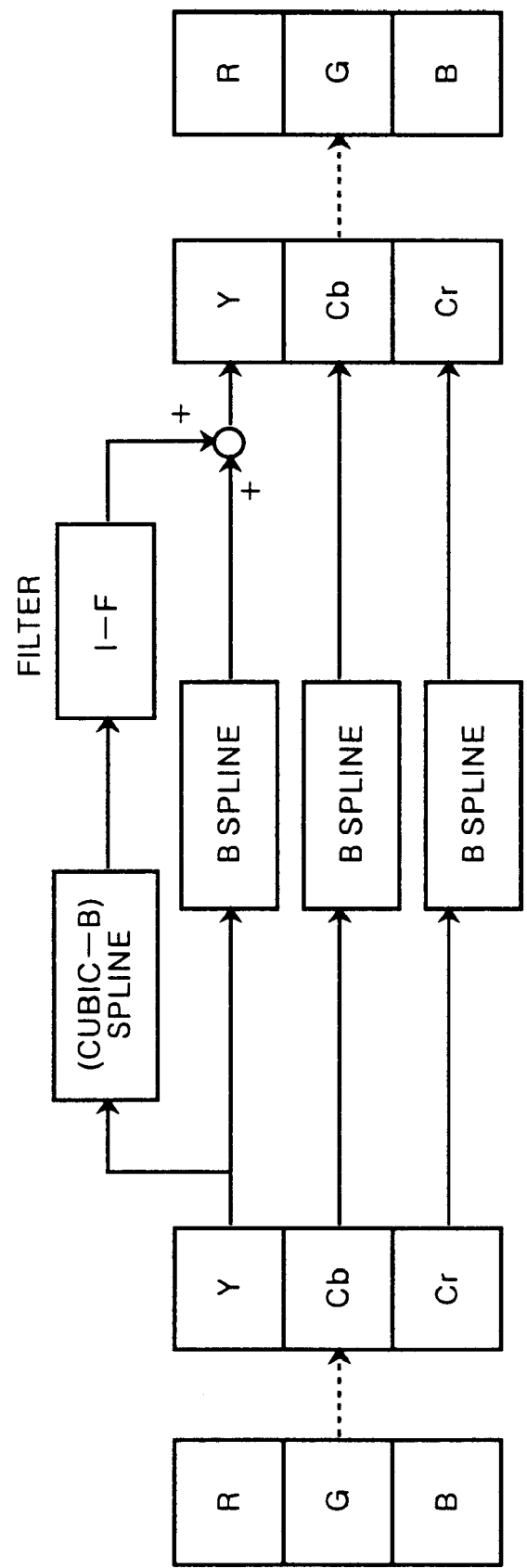
FIG. 12 is a flow chart showing a modification of the signal flow shown in FIG. 11.

Luminance value vector at the original point $Y_k$: Transposed vector of $Y_k^T$ The signal flow of Formula (29) may be illustrated as in FIG. 12. The signal flow in FIG. 12 is equivalent to that shown in FIG. 11.

The cases, wherein the composition of the output of the filter (i.e., the correction means 134') is carried out after conversion from YCC into RGB, will be described hereinbelow. As in Formula (29), with respect to the color difference signal components Cb and Cr, interpolated values $C_{1p}$ and $C_{2p}$ at the interpolation point $X_p$ may be represented by Formulas (30) and (31) shown below.

$$C_{1p} = b_k^T C_{1k} \quad (30)$$

$$C_{2p} = b_k^T C_{2k} \quad (31)$$

As in $Y_k$ in Formula (29), $C_{1k}$ and $C_{2k}$ in Formulas (30) and (31) are the color difference value vectors at the original point in the original image signal Sorg and may be represented as follows:

$$C_{1k}{}^T = (C_{1k-1} C_{1k} C_{1k+1} C_{1k+2})$$

First color difference vector at the original point $$C_{2k}{}^T = (C_{2k-1} C_{2k} C_{2k+1} C_{2k+2})$$

Second color difference vector at the original point $C_{1k}$: Transposed vector of $C_{1k}{}^T$ $C_{2k}$: Transposed vector of $C_{2k}{}^T$ In cases where the R, G, and B values at the interpolation point $X_p$ are represented respectively by $R_p$, $G_p$, $B_p$, the relationship between the YCC luminance and color difference signal components and the R, G, B color signal components may be represented by Formulas (32) and (33) shown below.

$$\begin{pmatrix} R_P \\ G_P \\ B_P \end{pmatrix} = A \begin{pmatrix} Y_P \\ C_{1P} \\ C_{2P} \end{pmatrix} + a \quad (32)$$

$$A = \begin{pmatrix} 1 & 0 & 1.402 \\ 1 & -0.344 & -0.714 \\ 1 & 1.772 & 0 \end{pmatrix} \quad a = \begin{pmatrix} 0 \\ 134.402 \\ -225.044 \end{pmatrix} \quad (33)$$

Substitution of Formulas (29), (30), and (31) into Formula (32) yields Formula (34) shown below.

$$\begin{pmatrix} R_P \\ G_P \\ B_P \end{pmatrix} = A \begin{pmatrix} (I-F)(C_k^T Y_k - b_k^T Y_k) + b_k^T Y_k \\ b_k^T C_{1k} \\ b_k^T C_{2k} \end{pmatrix} + a \quad (34)$$

$$= A \begin{pmatrix} b_k^T Y_k \\ b_k^T C_{1k} \\ b_k^T C_{2k} \end{pmatrix} + a + A \begin{pmatrix} (I-F)(c_k^T Y_k - b_k^T Y_k) \\ 0 \\ 0 \end{pmatrix}$$

$$= A \begin{pmatrix} b_k^T Y_k \\ b_k^T C_{1k} \\ b_k^T C_{2k} \end{pmatrix} + a + \begin{pmatrix} (I-F)(c_k^T Y_k - b_k^T Y_k) \\ (I-F)(c_k^T Y_k - b_k^T Y_k) \\ (I-F)(c_k^T Y_k - b_k^T Y_k) \end{pmatrix}$$

The two former terms in Formula (34) means that the B spline interpolating operation process is carried out on each of the YCC luminance and color difference signal components and the resulting signal components are converted into the R, G, and B color signal components. In cases where Formula (34) is utilized, the signal flow shown in FIG. 12 may be modified into the signal flow shown in FIG. 13.

Figure 13:
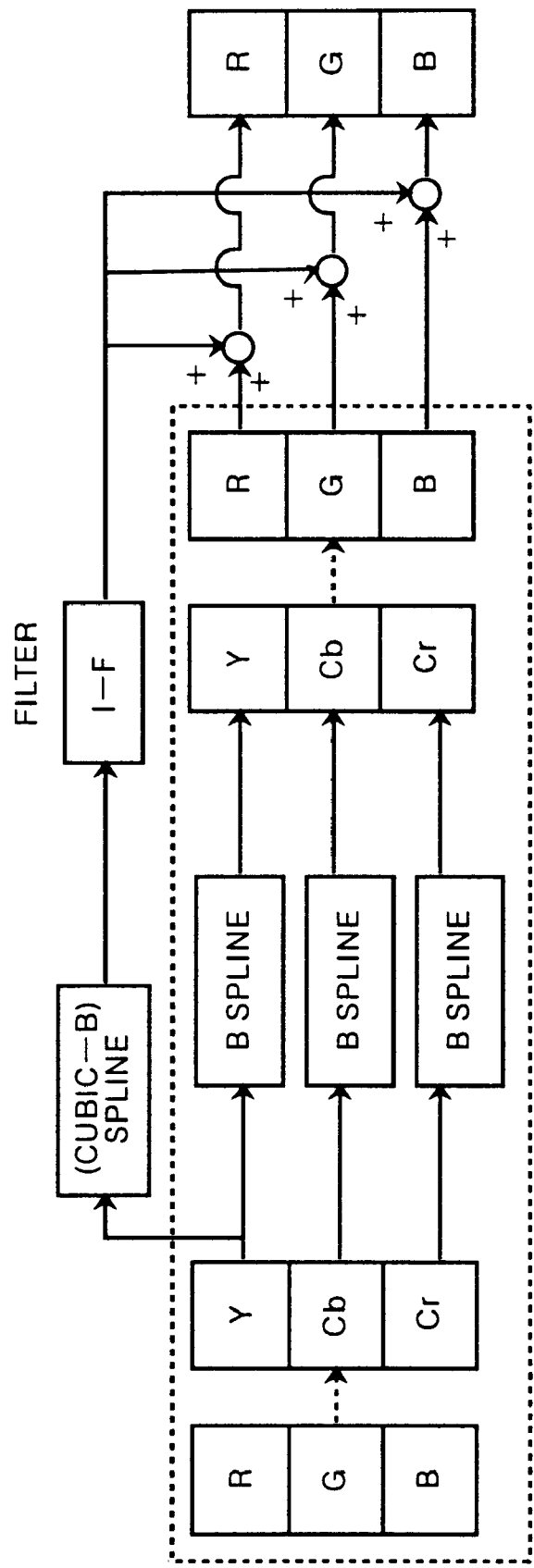
FIG. 13 is a flow chart showing a modification of the signal flow shown in FIG. 12.

The cases, wherein the order in which the conversion from the YCC luminance and color difference signal components into the R, G, B color signal components and the B spline interpolating operation process are carried out is changed, will be described hereinbelow. In FIG. 13, the interpolated values of the R, G, and B color signal components before being added to the output of the filter may be represented respectively by $R'_p$, $G'_p$, and $B'_p$. In such cases, from the two former terms in Formula (34), the interpolated values $R'_p$, $G'_p$, and $B'_p$, may be represented by Formula (35) shown below.

$$\begin{pmatrix} R'_P \\ G'_P \\ B'_P \end{pmatrix} = A \begin{pmatrix} b_k^T Y_k \\ b_k^T C_{1k} \\ b_k^T C_{2k} \end{pmatrix} + a \quad (35)$$

Hereinbelow, as an aid in facilitating the explanation, only the interpolated value $G'_p$ will be considered. The other interpolated values $R'_p$ and $B'_p$ may be obtained in the same manner as that for the interpolated value $G'_p$. From Formula (35), the interpolated value $G'_p$ may be represented by Formula (36) shown below.

$$G'_P = h_G \begin{pmatrix} b_k^T Y_k \\ b_k^T C_{1k} \\ b_k^T C_{2k} \end{pmatrix} + \alpha_G = h_G(Hb_k) + \alpha_G \quad (36)$$

$$h_G = (1 \; -0.344 \; -0.714) \quad \alpha_G = 134.402$$

$$H = \begin{pmatrix} Y_{k-1} & Y_k & Y_{k+1} & Y_{k+2} \\ C_{1k-1} & C_{1k} & C_{1k+1} & C_{1k+2} \\ C_{2k-1} & C_{2k} & C_{2k+1} & C_{2k+2} \end{pmatrix}$$

Since $h_G Hb_k$ in Formula (36) is a scalar value, Formula (36) may be modified into Formula (37) shown below.

$$G'_p = h_G Hb_k + \alpha_G \quad (37)$$

$$= (h_G Hb_k)^T + \alpha_G$$

$$= b_k^T H^T h_G^T + \alpha_G$$

From Formula (15) shown above, $b_{k-1}+b_k+b_{k+1}+b_{k+2}=1$. Therefore, Formula (37) may be represented by Formulas (38) and (39) shown below.

$$G'_p = b_k^T H^T h_G^T + \alpha_G \quad (38)$$

$$= b_k^T (h_G H)^T + \alpha_G b_k^T E^T$$

$$= b_k^T [(h_G H)^T + \alpha_G E^T]$$

$$= b_k^T (h_G H + \alpha_G E)$$

$$E = (1 \; 1 \; 1 \; 1) \quad (39)$$

The part of $(h_G H + \alpha_G E)^T$ in Formula (38) means the G components in the R, G, and B color signal components, which have been obtained from conversion of the YCC luminance and color difference signal components representing the picture elements $X_{k-1}$, $X_k$, $X_{k+1}$, and $X_{k+2}$. Therefore, Formula (38) as a whole means that the B spline interpolating operation process is carried out on the G components, which have been obtained by converting the YCC luminance and color difference signal components into the R, G, and B color signal components. Also, with respect to the R components and the B components, the same results are obtained when the order, in which the processing for conversion from the YCC luminance and color difference signal components into the R, G, and B color signal components and the B spline interpolating operation process are carried out, is changed.

Figure 14:
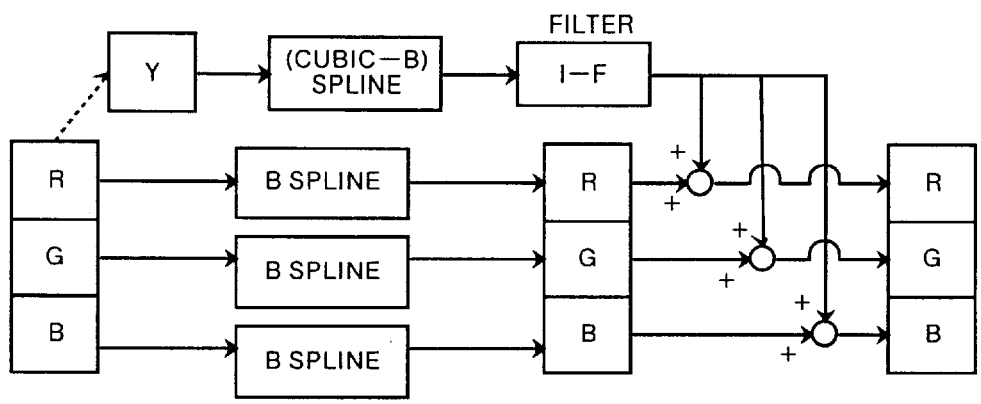
FIG. 14 is a flow chart showing a modification of the signal flow shown in FIG. 13.

In FIG. 13, in cases where the order, in which the processing for conversion from the YCC luminance and color difference signal components into the R, G, and B color signal components and the B spline interpolating operation process are carried out, is changed, the portion surrounded by the broken line in FIG. 13 is modified such that the R, G, and B color signal components may be converted into the YCC luminance and color difference signal components and thereafter the YCC luminance and color difference signal components are immediately returned to the R, G, and B color signal components. Therefore, the conversion from the R, G, and B color signal components into the YCC luminance and color difference signal components and the conversion from the YCC luminance and color difference signal components into the R, G, and B color signal components may be canceled each other, and the processing may be simply illustrated as in FIG. 14. FIG. 14 shows the signal flow in the processing, which is carried out in the fifth embodiment of the interpolating operation apparatus of FIG. 8 in accordance with the present invention. Accordingly, it will be understood that the fifth embodiment of the interpolating operation apparatus in accordance with the present invention and the interpolating operation apparatus for comparison shown in FIG. 10 have substantially identical functions.

As for an image having an image size of M×N picture elements, it may be roughly estimated that 3MN times of multiplications are necessary for calculating each of the YCC luminance and color difference signal components from the R, G, and B color signal components or for calculating each of the R, G, and B color signal components from the YCC luminance and color difference signal components. Therefore, in order for the conversion from the R, G, and B color signal components into the YCC luminance and color difference signal components to be carried out completely, 9MN times of multiplications are necessary. Also, for the interpolating operation, such as the cubic spline interpolating operation process, wherein 4×4 filter processing is carried out, 16MN times of multiplications are necessary. Table 1 below shows a comparison of the number of times of multiplications necessary for the color conversion and the interpolating operation between the fifth embodiment of the interpolating operation apparatus in accordance with the present invention and the interpolating operation apparatus for comparison. From Table 1 below, it can be found that, with the fifth embodiment of the interpolating operation apparatus in accordance with the present invention, the time required for the operations can be kept shorter by approximately 20% than with the interpolating operation apparatus for comparison.

TABLE 1

| Apparatus for comparison | | Fifth embodiment | |
|---|---|---|---|
| RGB→YCC | 9 MN | RGB→Y | 3 MN |
| YCC→RGB | 9 MN | | |
| Cubic spline | 16 MN | (Cubic-B) spline | 16 MN |
| B spline | 16 MN × 3 | B spline | 16 MN × 3 |
| Total | 82 MN | Total | 67 MN |

As described above, with the fifth embodiment of the interpolating operation apparatus in accordance with the present invention, the visible image reproduced from the interpolation image signal S' having been obtained with the processing described above is the one, in which an edge portion, a fine design portion, and the like, have a comparatively high level of sharpness, and a portion, such as a portion corresponding to a flesh-color part of a person, is smooth and has a comparatively low level of sharpness. Therefore, the image size can be enlarged or reduced such that an image having appropriate levels of sharpness in accordance with different portions in the image can be reproduced. Also, with the fifth embodiment of the interpolating operation apparatus in accordance with the present invention, wherein only the luminance signal components Y are calculated from the original image signal Sorg and the interpolation image signal S' as in the interpolating operation apparatus for comparison shown in FIG. 10 is thereby obtained, it is not necessary for operations to be carried out for completely converting the original image signal Sorg into the luminance signal components Y and color difference signal components Cb and Cr. Accordingly, the time required for operations can be kept short, and the interpolating operation can be carried out quickly.

A sixth embodiment of the interpolating operation apparatus for an image signal in accordance with the present invention will be described hereinbelow.

Figure 15:
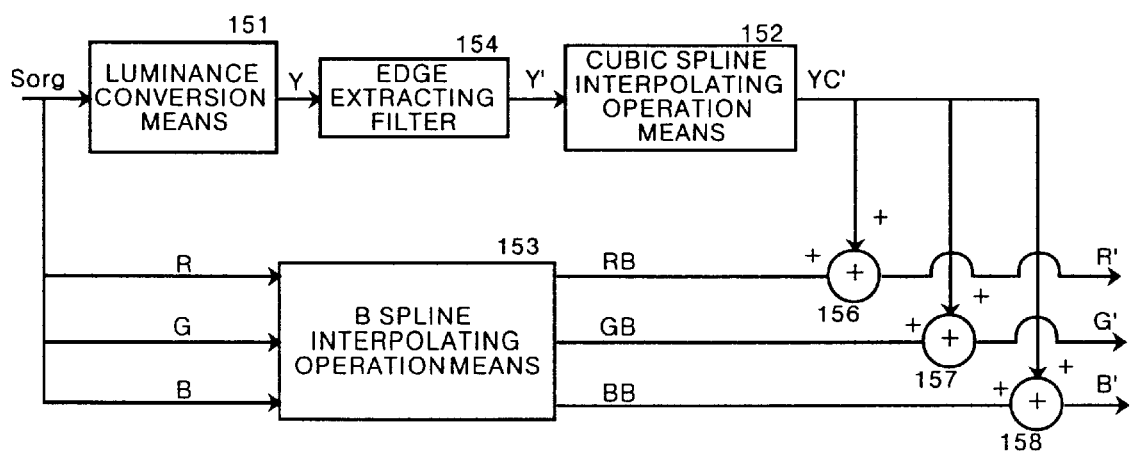
FIG. 15 is a block diagram showing a sixth embodiment of the interpolating operation apparatus for carrying out the interpolating operation method for an image signal in accordance with the present invention.

FIG. 15 is a block diagram showing a sixth embodiment of the interpolating operation apparatus for carrying out the interpolating operation method for an image signal in accordance with the present invention. The sixth embodiment of the interpolating operation apparatus is incorporated in an image reproducing system in the same manner as that for the interpolating operation apparatus 130 shown in FIG. 8. In FIG. 15, the image signal storing device 110, the image processing apparatus 120, and the image reproducing means 140, which are illustrated in FIG. 8, are not shown. The sixth embodiment of the interpolating operation apparatus comprises a luminance conversion means 151 for obtaining a luminance signal component Y from the R, G, and B color signal components, which represent each of the picture elements in the original color image represented by the original image signal Sorg, with Formula (24) shown above. The interpolating operation apparatus also comprises an edge extracting filter 154 for carrying out filtering on the luminance signal components Y and with a filter shown in FIG. 16 and thereby extracting an edge in the image. Edge extraction signal components Y' are thereby obtained. The interpolating operation apparatus further comprises a cubic spline interpolating operation means 152 for carrying out a cubic spline interpolating operation process on the edge extraction signal components Y' and thereby obtaining an interpolated luminance signal component YC'. The interpolating operation apparatus still further comprises a B spline interpolating operation means 153 for carrying out the B spline interpolating operation process on each of the R color signal components, the G color signal components, and the B color signal components, which constitute the original image signal Sorg, and thereby obtaining interpolated signal components RB, GB, and BB. The interpolating operation apparatus also comprises addition means 156, 157, and 158 for adding the interpolated luminance signal component YC' to the interpolated signal components RB, GB, and BB and thereby obtaining interpolated signal components RB', GB', and BB'. In this manner, a final interpolation image signal S', which is composed of the thus obtained interpolated signal components RB', GB', and BB', is obtained.

How the sixth embodiment operates will be described hereinbelow. The original image signal Sorg is fed into the luminance conversion means 151, and the luminance signal components Y of the original image signal Sorg are obtained from the luminance conversion means 151. The original image signal Sorg is also fed into the B spline interpolating operation means 153. In the B spline interpolating operation means 153, as in the fifth embodiment described above, the B spline interpolating operation process is carried out on each of the R color signal components, the G color signal components, and the B color signal components. The interpolated signal components RB, GB, and BB are obtained from the B spline interpolating operation means 153. In the edge extracting filter 154, the filtering is carried out on the luminance signal components Y, and an edge in the image is thereby extracted. In this manner, the edge extraction signal components Y' are obtained from the edge extracting filter 154. The edge extraction signal components Y' are fed into the cubic spline interpolating operation means 152, and the interpolated luminance signal components YC' are thereby obtained. The edge extraction signal components Y' represent only the edge components in the luminance signal components Y. In the interpolated luminance signal components YC', which are obtained by carrying out the cubic spline interpolating operation process on the edge extraction signal components Y, the edge portion has been emphasized. Also, in the addition means 156, 157, and 158, the interpolated luminance signal component YC' are added to the interpolated signal components RB, GB, and BB. In this manner, the interpolated signal components RB', GB', and BB' are obtained. As in the fifth embodiment described above, an image reproduced from the thus obtained interpolated signal components RB', GB', and BB' is the one, in which an edge portion, a fine design portion, and the like, have a comparatively high level of sharpness, and a portion, such as a portion corresponding to a flesh-color part of a person, is smooth and has a comparatively low level of sharpness. Therefore, the image size can be enlarged or reduced such that an image having appropriate levels of sharpness in accordance with different portions in the image can be reproduced.

Figures 16, 17:
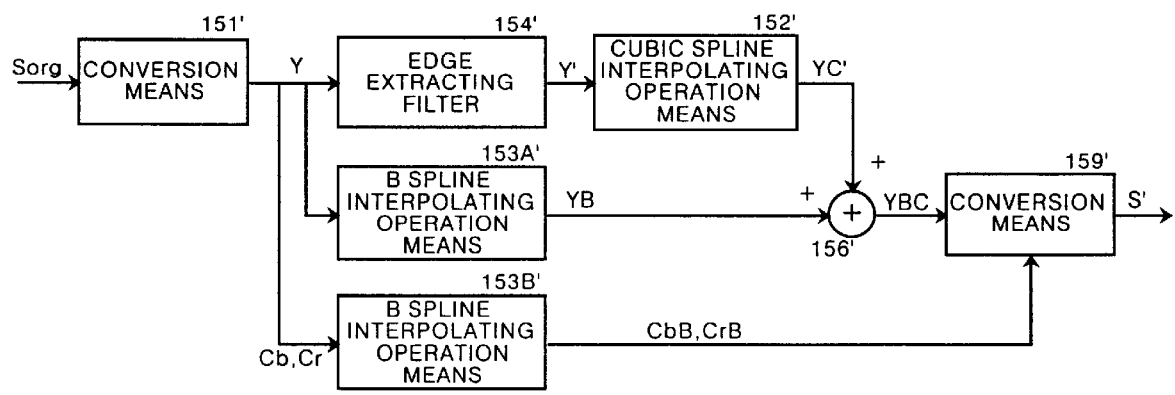
FIG. 16 is an explanatory view showing an edge extracting filter.
FIG. 17 is a block diagram showing an interpolating operation apparatus for an image signal, which is taken for comparison with the sixth embodiment.
Figure 18:
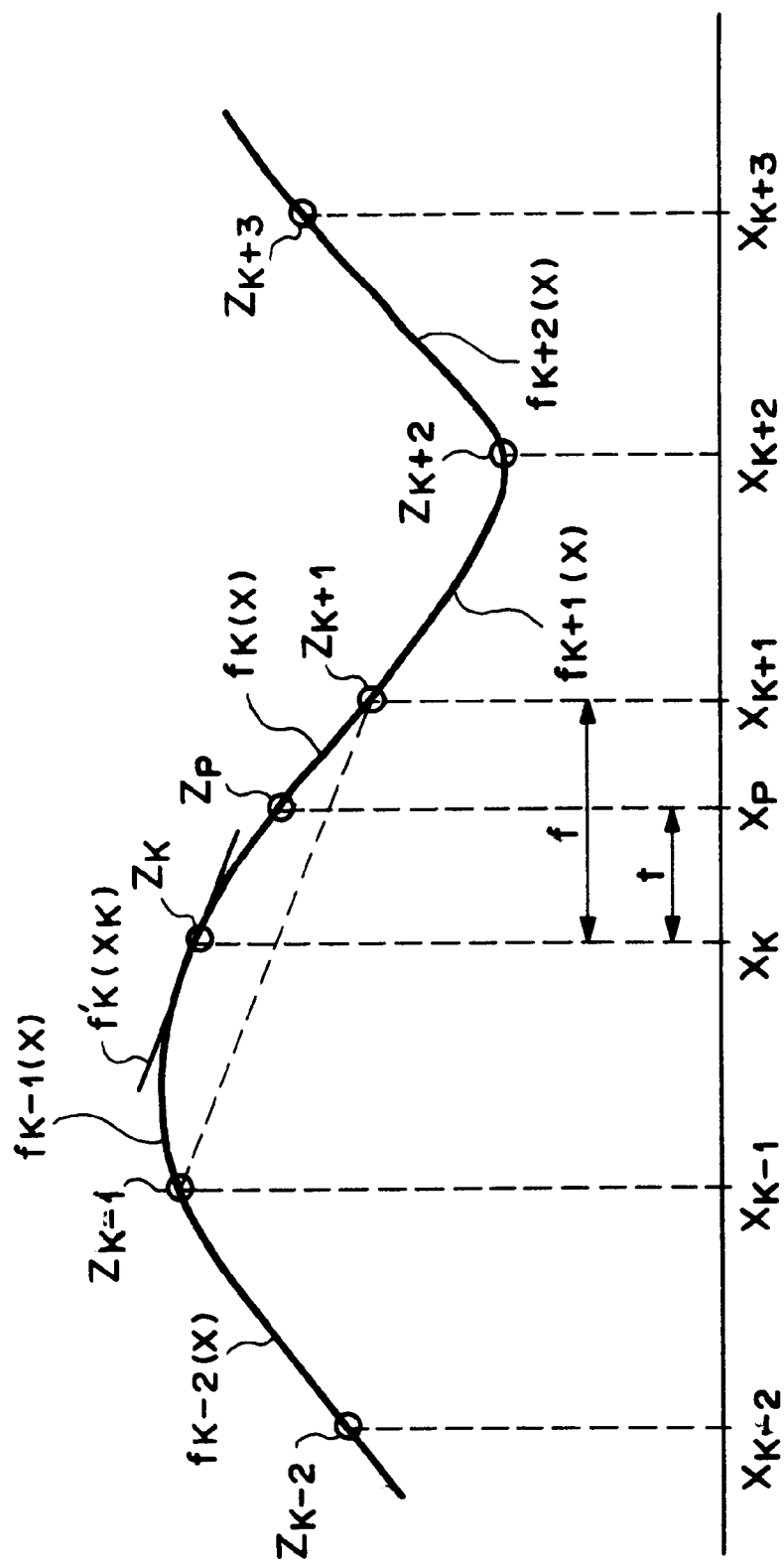
FIG. 18 is an explanatory graph showing how interpolated image signal components are obtained with a cubic spline interpolating operation from original image signal components, which are sampled with a period of an equal interval and represent sampling points (picture elements) arrayed in one direction.

A comparison between the sixth embodiment of the interpolating operation apparatus in accordance with the present invention and an interpolating operation apparatus for comparison will be made hereinbelow. FIG. 17 shows an interpolating operation apparatus, which is taken for comparison with the sixth embodiment. The interpolating operation apparatus for comparison, which is shown in FIG. 17, comprises a first conversion means 151' for converting R, G, and B color signal components, which represent each of the picture elements, into YCC luminance and color difference signal components with Formula (27) shown above. The interpolating operation apparatus for comparison also comprises an edge extracting filter 154' for carrying out filtering on the luminance signal components Y, which are among the YCC luminance and color difference signal components having been obtained from the first conversion means 151', and with the same filter a that in the sixth embodiment described above and thereby extracting an edge in the image from the luminance signal components Y. Edge extraction signal components Y' are thereby obtained. The interpolating operation apparatus for comparison further comprises a cubic spline interpolating operation means 152' for obtaining an interpolated luminance signal component YC' by employing a cubic spline interpolating operation process with respect to the edge extraction signal components Y'. The interpolating operation apparatus for comparison still further comprises a B spline interpolating operation means 153A' for obtaining an interpolated luminance signal component YB by employing a B spline interpolating operation process with respect to the luminance signal components Y. The interpolating operation apparatus for comparison also comprises a B spline interpolating operation means 153B' for obtaining interpolated color difference signal components CbB and CrB, respectively, by employing the B spline interpolating operation process with respect to the color difference signal components Cb and Cr, which are among the YCC luminance and color difference signal components having been obtained from the first conversion means 151'. The interpolating operation apparatus for comparison further comprises an addition means 156' for calculating an addition signal component YBC, which represents the sum of the interpolated luminance signal component YC' and the interpolated luminance signal component YB. The interpolating operation apparatus for comparison still further comprises a second conversion means 159' for converting the addition signal component YBC and the interpolated color difference signal components CbB, CrB into interpolated color signal components R', G', and B' with Formula (28) shown above.

With the thus constituted interpolating operation apparatus for comparison, it is necessary for the R, G, and B color signal components to be completely converted in the first conversion means 151' into the YCC luminance and color difference signal components. However, with the sixth embodiment in accordance with the present invention, wherein only the luminance signal components Y are calculated from the original image signal Sorg and the interpolation image signal S' as in the interpolating operation apparatus for comparison shown in FIG. 17 is thereby obtained, it is not necessary for operations to be carried out for completely converting the original image signal Sorg into the luminance signal components Y and color difference signal components Cb and Cr. Accordingly, the time required for operations can be kept short, and the interpolating operation can be carried out quickly.

In the embodiments described above, the interpolating operation apparatus utilizes the original image signal Sorg having been previously stored in the image signal storing device 110. However, the interpolating operation apparatus in accordance with the present invention is not limited to these embodiments. For example, an image signal representing an image, which has been detected by using an image read-out apparatus, may be utilized.

What is claimed is:

1. An interpolating operation method for an image signal, wherein an interpolating operation is carried out on an original image signal, which is made up of a series of image signal components representing picture elements in an image, an interpolation image signal being obtained from the interpolating operation, the interpolation image signal being made up of a series of image signal components, which occur at intervals different from those of the image signal components of the original image signal, the method comprising the steps of:

i) carrying out interpolating operations on the original image signal and in accordance with first and second interpolating operation processes for obtaining interpolation images having different levels of sharpness, a feature measure, which represents the sharpness of the original image signal, being thereby obtained, ii) carrying out an interpolating operation on the original image signal and in accordance with a third interpolating operation process, an interpolation image signal being thereby calculated, and iii) correcting said interpolation image signal in accordance with said feature measure, a final interpolation image signal being thereby obtained.

2. A method as defined in claim 1 wherein one of said first and second interpolating operation processes for obtaining interpolation images having different levels of sharpness is a B spline interpolating operation process, and the other interpolating operation process is a cubic spline interpolating operation process.

3. A method as defined in claim 1 wherein said third interpolating operation process is either one of said first interpolating operation process and said second interpolating operation process.

4. A method as defined in claim 2 wherein said third interpolating operation process is either one of said first interpolating operation process and said second interpolating operation process.

5. A method as defined in claim 1, wherein the calculation of said feature measure is carried out by calculating difference values between an interpolation image signal, which is obtained by carrying out the interpolating operation on the original image signal and in accordance with said first interpolating operation process, and an interpolation image signal, which is obtained by carrying out the interpolating operation on the original image signal and in accordance with said second interpolating operation process.

6. A method as defined in claim 1, wherein the calculation of said feature measure is carried out by calculating difference interpolation coefficients, which represent differences between interpolation coefficients in said first interpolating operation process and interpolation coefficients in said second interpolating operation process, carrying out an interpolating operation on the original image signal and in accordance with said difference interpolation coefficients, and thereby calculating a difference interpolation image signal.

7. An interpolating operation method for an image signal, wherein an interpolating operation is carried out on an original image signal, which is made up of a series of image signal components representing picture elements in a color image, an interpolation image signal being obtained from the interpolating operation, the interpolation image signal being made up of a series of image signal components, which occur at intervals different from those of the image signal components of the original image signal, the method comprising the steps of:

i) converting R, G, and B color signal components, which represent each of the picture elements in the color image represented by the original image signal, into a luminance signal component and a color difference signal component, which represent each of the picture elements in the color image, ii) calculating an interpolated luminance signal component with respect to the thus obtained luminance signal components, which represent the picture elements in the color image, the calculation being made by employing an interpolating operation technique for an image signal, wherein an interpolating operation is carried out on an original image signal, which is made up of a series of image signal components representing picture elements in an image, an interpolation image signal being obtained from the interpolating operation, the interpolation image signal being made up of a series of image signal components, which occur at intervals different from those of the image signal components of the original image signal, the interpolating operation technique for an image signal comprising the steps of:

a) carrying out interpolating operations on the original image signal and in accordance with first and second interpolating operation processes for obtaining interpolation images having different levels of sharpness, a feature measure, which represents the sharpness of the original image signal, being thereby obtained, b) carrying out an interpolating operation on the original image signal and in accordance with a third interpolating operation process, an interpolation image signal being thereby calculated, and c) correcting said interpolation image signal in accordance with said feature measure, a final interpolation image signal being thereby obtained, iii) calculating an interpolated color difference signal component by employing an interpolating operation process, which attaches importance to stability, with respect to the thus obtained color difference signal components, which represent the picture elements in the color image, and iv) converting the interpolated luminance signal component and the interpolated color difference signal component into R, G, and B color signal components, an interpolation image signal, which is composed of the R, G, and B color signal components having been obtained from the conversion of the interpolated luminance signal component and the interpolated color difference signal component, being thereby obtained.

8. A method as defined in claim 7 wherein, in the interpolating operation technique for an image signal, one of said first and second interpolating operation processes for obtaining interpolation images having different levels of sharpness is a B spline interpolating operation process, and the other interpolating operation process is a cubic spline interpolating operation process.

9. A method as defined in claim 7 wherein, in the interpolating operation technique for an image signal, said third interpolating operation process is either one of said first interpolating operation process and said second interpolating operation process.

10. A method as defined in claim 8 wherein, in the interpolating operation technique for an image signal, said third interpolating operation process is either one of said first interpolating operation process and said second interpolating operation process.

11. A method as defined in claim 7, wherein, in the interpolating operation technique for an image signal, the calculation of said feature measure is carried out by calculating difference values between an interpolation image signal, which is obtained by carrying out the interpolating operation on the original image signal and in accordance with said first interpolating operation process, and an interpolation image signal, which is obtained by carrying out the interpolating operation on the original image signal and in accordance with said second interpolating operation process.

12. A method as defined in claim 7, wherein, in the interpolating operation technique for an image signal, the calculation of said feature measure is carried out by calculating difference interpolation coefficients, which represent differences between interpolation coefficients in said first interpolating operation process and interpolation coefficients in said second interpolating operation process, carrying out an interpolating operation on the original image signal and in accordance with said difference interpolation coefficients, and thereby calculating a difference interpolation image signal.

13. An interpolating operation apparatus for an image signal, wherein an interpolating operation is carried out on an original image signal, which is made up of a series of image signal components representing picture elements in an image, an interpolation image signal being obtained from the interpolating operation, the interpolation image signal being made up of a series of image signal components, which occur at intervals different from those of the image signal components of the original image signal, the apparatus comprising:

i) a feature measure calculating means for carrying out interpolating operations on the original image signal and in accordance with first and second interpolating operation processes for obtaining interpolation images having different levels of sharpness, a feature measure, which represents the sharpness of the original image signal, being thereby obtained, ii) an interpolating operation means for carrying out an interpolating operation on the original image signal and in accordance with a third interpolating operation process, an interpolation image signal being thereby calculated, and iii) a correction means for correcting said interpolation image signal in accordance with said feature measure, a final interpolation image signal being thereby obtained.

14. An apparatus as defined in claim 13 wherein one of said first and second interpolating operation processes for obtaining interpolation images having different levels of sharpness is a B spline interpolating operation process, and the other interpolating operation process is a cubic spline interpolating operation process.

15. An apparatus as defined in claim 13 wherein said third interpolating operation process is either one of said first interpolating operation process and said second interpolating operation process.

16. An apparatus as defined in claim 14 wherein said third interpolating operation process is either one of said first interpolating operation process and said second interpolating operation process.

17. An apparatus as defined in claim 13, wherein said feature measure calculating means comprises means for calculating, as said feature measure, difference values between an interpolation image signal, which is obtained by carrying out the interpolating operation on the original image signal and in accordance with said first interpolating operation process, and an interpolation image signal, which is obtained by carrying out the interpolating operation on the original image signal and in accordance with said second interpolating operation process.

18. An apparatus as defined in claim 13, wherein said feature measure calculating means comprises:
   means for calculating difference interpolation coefficients, which represent differences between interpolation coefficients in said first interpolating operation process and interpolation coefficients in said second interpolating operation process, and
   means for calculating, as said feature measure, a difference interpolation image signal, which is obtained by carrying out an interpolating operation on the original image signal and in accordance with said difference interpolation coefficients.

19. An interpolating operation apparatus for an image signal, wherein an interpolating operation is carried out on an original image signal, which is made up of a series of image signal components representing picture elements in a color image, an interpolation image signal being obtained from the interpolating operation, the interpolation image signal being made up of a series of image signal components, which occur at intervals different from those of the image signal components of the original image signal, the apparatus comprising:

i) a first conversion means for converting R, G, and B color signal components, which represent each of the picture elements in the color image represented by the original image signal, into a luminance signal component and a color difference signal component, which represent each of the picture elements in the color image, ii) an interpolated luminance signal component calculating means for calculating an interpolated luminance signal component with respect to the thus obtained luminance signal components, which represent the picture elements in the color image,
   the calculation being made by employing an interpolating operation technique for an image signal, wherein an interpolating operation is carried out on an original image signal, which is made up of a series of image signal components representing picture elements in an image, an interpolation image signal being obtained from the interpolating operation, the interpolation image signal being made up of a series of image signal components, which occur at intervals different from those of the image signal components of the original image signal, the interpolating operation technique for an image signal comprising the steps of:
   a) carrying out interpolating operations on the original image signal and in accordance with first and second interpolating operation processes for obtaining interpolation images having different levels of sharpness, a feature measure, which represents the sharpness of the original image signal, being thereby obtained,
   b) carrying out an interpolating operation on the original image signal and in accordance with a third interpolating operation process, an interpolation image signal being thereby calculated, and
   c) correcting said interpolation image signal in accordance with said feature measure, a final interpolation image signal being thereby obtained, iii) an interpolated color difference signal component calculating means for calculating an interpolated color difference signal component by employing an interpolating operation process, which attaches importance to stability, with respect to the thus obtained color difference signal components, which represent the picture elements in the color image, and iv) a second conversion means for converting the interpolated luminance signal component and the interpolated color difference signal component into R, G, and B color signal components,
   an interpolation image signal, which is composed of the R, G, and B color signal components having been obtained from the conversion of the interpolated luminance signal component and the interpolated color difference signal component, being thereby obtained.

20. An apparatus as defined in claim 19 wherein, in the interpolating operation technique for an image signal, one of said first and second interpolating operation processes for obtaining interpolation images having different levels of sharpness is a B spline interpolating operation process, and the other interpolating operation process is a cubic spline interpolating operation process.

21. An apparatus as defined in claim 19 wherein, in the interpolating operation technique for an image signal, said third interpolating operation process is either one of said first interpolating operation process and said second interpolating operation process.

22. An apparatus as defined in claim 20 wherein, in the interpolating operation technique for an image signal, said third interpolating operation process is either one of said first interpolating operation process and said second interpolating operation process.

23. An apparatus as defined in claim 19, wherein, in the interpolating operation technique for an image signal, the calculation of said feature measure is carried out by calculating difference values between an interpolation image signal, which is obtained by carrying out the interpolating operation on the original image signal and in accordance with said first interpolating operation process, and an interpolation image signal, which is obtained by carrying out the interpolating operation on the original image signal and in accordance with said second interpolating operation process.

24. An apparatus as defined in claim 19, wherein, in the interpolating operation technique for an image signal, the calculation of said feature measure is carried out by calculating difference interpolation coefficients, which represent differences between interpolation coefficients in said first interpolating operation process and interpolation coefficients in said second interpolating operation process, carrying out an interpolating operation on the original image signal and in accordance with said difference interpolation coefficients, and thereby calculating a difference interpolation image signal.

25. An interpolating operation method for an image signal, wherein an interpolating operation is carried but on an original image signal, which is made up of a series of image signal components representing picture elements in a color image, an interpolation image signal being obtained from the interpolating operation, the interpolation image signal being made up of a series of image signal components, which occur at intervals different from those of the image signal components of the original image signal, the method comprising the steps of:

i) carrying out an interpolating operation on each of R color signal components, G color signal components, and B color signal components, which represent the picture elements in the color image represented by the original image signal, said interpolating operation being carried out by employing a predetermined interpolating operation process, intermediate interpolated color signal components being thereby calculated with respect to each of the R color signal components, the G color signal components, and the B color signal components, ii) calculating luminance signal components of the original image signal from the R, G, and B color signal components, which represent the picture elements in the color image represented by the original image signal, iii) calculating a feature measure, which represents the sharpness of the original image signal, from said luminance signal components, and iv) correcting said intermediate interpolated color signal components in accordance with said feature measure, an interpolation image signal, which is composed of the corrected R, G, and B intermediate interpolated color signal components, being thereby obtained.

26. A method as defined in claim 25 wherein said predetermined interpolating operation process is an interpolating operation process, which attaches importance to stability.

27. A method as defined in claim 25 wherein the calculation of said feature measure is carried out by calculating difference interpolation coefficients, which represent differences between interpolation coefficients in an interpolating operation process, which attaches importance to sharpness, and interpolation coefficients in said predetermined interpolating operation process, carrying out an interpolating operation on said luminance signal components and in accordance with said difference interpolation coefficients, and thereby calculating difference interpolated luminance signal components.

28. A method as defined in claim 25 wherein the calculation of said feature measure is carried out by extracting edge components from said luminance signal components, and carrying out an interpolating operation on said edge components and in accordance with an interpolating operation process, which attaches importance to sharpness.

29. An interpolating operation apparatus for an image signal, wherein an interpolating operation is carried out on an original image signal, which is made up of a series of image signal components representing picture elements in a color image, an interpolation image signal being obtained from the interpolating operation, the interpolation image signal being made up of a series of image signal components, which occur at intervals different from those of the image signal components of the original image signal, the apparatus comprising:

i) an intermediate interpolating operation means for carrying out an interpolating operation on each of R color signal components, G color signal components, and B color signal components, which represent the picture elements in the color image represented by the original image signal, said interpolating operation being carried out by employing a predetermined interpolating operation process, intermediate interpolated color signal components being thereby calculated with respect to each of the R color signal components, the G color signal components, and the B color signal components, ii) a luminance signal component calculating means for calculating luminance signal components of the original image signal from the R, G, and B color signal components, which represent the picture elements in the color image represented by the original image signal, iii) a feature measure calculating means for calculating a feature measure, which represents the sharpness of the original image signal, from said luminance signal components, and iv) a correction means for correcting said intermediate interpolated color signal components in accordance with said feature measure, an interpolation image signal, which is composed of the corrected R, G, and B intermediate interpolated color signal components, being thereby obtained.

30. An apparatus as defined in claim 29 wherein said predetermined interpolating operation process is an interpolating operation process, which attaches importance to stability.

31. An apparatus as defined in claim 29 wherein said feature measure calculating means is means that carries out the calculation of said feature measure by calculating difference interpolation coefficients, which represent differences between interpolation coefficients in an interpolating operation process, which attaches importance to sharpness, and interpolation coefficients in said predetermined interpolating operation process, carrying out an interpolating operation on said luminance signal components and in accordance with said difference interpolation coefficients, and thereby calculating difference interpolated luminance signal components.

32. An apparatus as defined in claim 29 wherein said feature measure calculating means is means that carries out the calculation of said feature measure by extracting edge components from said luminance signal components, and carrying out an interpolating operation on said edge components and in accordance with an interpolating operation process, which attaches importance to sharpness.

* * * * *